(12) United States Patent
Su et al.

(10) Patent No.: US 12,349,146 B2
(45) Date of Patent: *Jul. 1, 2025

(54) METHOD AND APPARATUS FOR PUCCH COVERAGE ENHANCEMENT

(71) Applicant: Telefonaktiebolaget LM Ericsson (publ), Stockholm (SE)

(72) Inventors: Ling Su, Beijing (CN); Zhipeng Lin, Nanjing (CN); Robert Mark Harrison, Grapevine, TX (US); Andreas Cedergren, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,864

(22) Filed: Jan. 18, 2024

(65) Prior Publication Data
US 2024/0236997 A1    Jul. 11, 2024

Related U.S. Application Data

(63) Continuation of application No. 18/031,923, filed as application No. PCT/CN2021/106814 on Jul. 16, 2021, now Pat. No. 11,895,661.

(30) Foreign Application Priority Data

Oct. 16, 2020    (WO) ................ PCT/CN2020/121585

(51) Int. Cl.
H04W 72/21    (2023.01)
H04L 5/00    (2006.01)
H04W 72/51    (2023.01)

(52) U.S. Cl.
CPC ........... *H04W 72/21* (2023.01); *H04L 5/0012* (2013.01); *H04W 72/51* (2023.01)

(58) Field of Classification Search
CPC ....................................................... H04W 72/12
USPC ......................................................... 370/329
See application file for complete search history.

(56) References Cited

U.S. PATENT DOCUMENTS

2016/0337157 A1    11/2016    Papasakellariou et al.
2020/0220592 A1    7/2020    Ryu et al.

OTHER PUBLICATIONS

Author Unknown, "Technical Specification Group Radio Access Network; NR; Physical layer procedures for control (Release 15)," Technical Specification 38.213, Version 15.9.0, Mar. 2020, 3GPP Organizational Partners, 109 pages.

(Continued)

*Primary Examiner* — Angel T Brockman
(74) *Attorney, Agent, or Firm* — Withrow & Terranova, PLLC

(57) ABSTRACT

Embodiments of the present disclosure provide methods, apparatus and computer program products for transmitting and receiving an uplink signal on physical control channel. A method comprises: determining that a terminal device has a capability of transmitting the uplink signal on physical control channel in at least a first time instant and a second time instant coherently; performing a first transmission of the uplink signal on physical control channel in the first time instant in a first set of subcarriers; and performing a second transmission of the uplink signal on physical control channel in the second time instant in a second set of subcarriers.

20 Claims, 14 Drawing Sheets

(56) References Cited

OTHER PUBLICATIONS

Author Unknown, "Technical Specification Group Radio Access Network; NR; Radio Resource Control (RRC) protocol specification (Release 15)," Technical Specification 38.331, Version 15.6.0, Jun. 2019, 3GPP Organizational Partners, 519 pages.
VIVO, "R1-2005396: Discussion on Solutions for PUCCH coverage enhancement," 3GPP TSG-RAN WG1 #102-e, Aug. 17-28, 2020, Electronic Meeting, 4 pages.
Intention to Grant for European Patent Application No. 21748492.2, mailed Nov. 24, 2023, 8 pages.
International Search Report and Written Opinion for International Patent Application No. PCT/CN2021/106814, mailed Oct. 26, 2021, 19 pages.
Notice of Allowance for U.S. Appl. No. 18/031,923, mailed Sep. 29, 2023, 7 pages.
Corrected Notice of Allowance for U.S. Appl. No. 18/031,923, mailed Oct. 27, 2023, 5 pages.

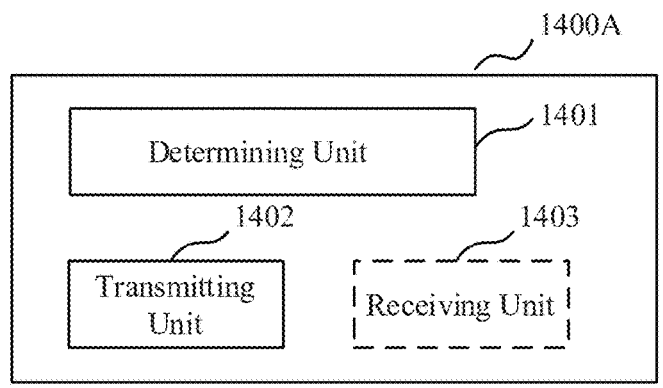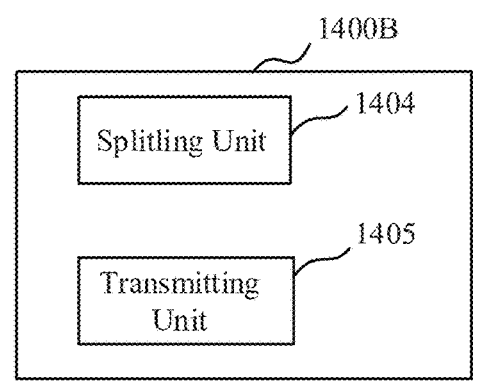
Fig. 14A          Fig.14B
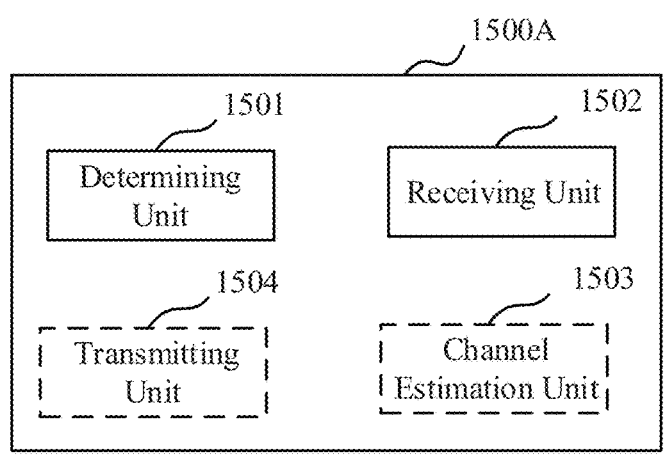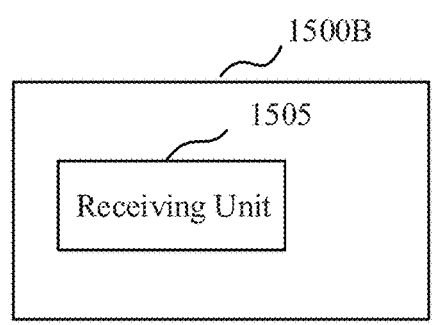
Fig. 15A          Fig. 15B

METHOD AND APPARATUS FOR PUCCH COVERAGE ENHANCEMENT

This application is a continuation of U.S. patent application Ser. No. 18/031,923, filed Apr. 14, 2023, now U.S. Pat. No. 11,895,661; which is a 35 U.S.C. § 371 national phase filing of International Application No. PCT/CN2021/106814, filed Jul. 16, 2021, which claims the benefit of International Application No. PCT/CN2020/121585, filed Oct. 16, 2020, the disclosures of which are incorporated herein by reference in their entireties.

TECHNICAL FIELD

The non-limiting and exemplary embodiments of the present disclosure generally relate to the technical field of wireless communications, and specifically to methods, apparatus, and computer programs for coverage enhancement of an uplink control channel, such as PUCCH (Physical Uplink Control Channel).

BACKGROUND

This section introduces aspects that may facilitate a better understanding of the disclosure. Accordingly, the statements of this section are to be read in this light and are not to be understood as admissions about what is in the prior art or what is not in the prior art.

An uplink control channel, such as PUCCH, is used to transmit uplink control information from a terminal device to a network node. When a radio resource control (RRC) connection is established for a specific terminal device (e.g. a User Equipment (UE)), a dedicated PUCCH resource is allocated to the terminal device. Nowadays, a PUCCH for a UE in a RRC connected state has been identified as one of the bottlenecks of network coverage. Cross-slot channel estimation was proposed as a candidate solution of coverage enhancement of PUCCH. Accordingly, it is desirable to provide a new mechanism to support cross-slot channel estimation for PUCCH.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Various embodiments of the present disclosure mainly aim at providing methods, apparatus and computer programs for supporting cross-slot channel estimation for an uplink control channel. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided a method for transmitting an uplink signal on physical control channel. The method comprises: determining that a terminal device has a capability of transmitting the uplink signal on physical control channel in at least a first time instant and a second time instant coherently; performing a first transmission of the uplink signal on physical control channel in the first time instant in a first set of subcarriers; and performing a second transmission of the uplink signal on physical control channel in the second time instant in a second set of subcarriers.

In some embodiments, the second transmission of the uplink signal on physical control channel may be a repetition of the first transmission of the uplink signal on physical control channel.

In some embodiments, the capability of transmitting the uplink signal on physical control channel in at least the first time instant and the second time instant coherently may comprise a capability of transmitting the uplink signal on physical control channel in at least the first time instant and the second time instant with a phase-related difference lower than a threshold.

In some embodiments, the method may further comprise indicating to a network node that the terminal device has the capability of transmitting the uplink signal on physical control channel in at least the first time instant and the second time instant coherently.

In some embodiments, each of the first time instant and the second time instant may comprise: one or more slots; and/or one or more sub-slots; and/or one or more multiple-slots. The second time instant may immediately follow the first time instant.

In some embodiments, the capability of transmitting the uplink signal on physical control channel in at least the first time instant and the second time instant coherently may be determined based on at least one of the following: whether the first time instant and the second time instant are consecutive; a change in transmission power between the first time instant and the second time instant; a frequency offset between a central frequency of the first set of subcarriers and a central frequency of the second set of subcarriers; and an uplink spatial relation between uplink control channel transmissions in the first time instant and the second time instant.

In some embodiments, the method may further comprise indicating to a network node of a number of time instants in which the terminal device has the capability of transmitting the uplink signal on physical control channel coherently.

In some embodiments, the method may further comprise receiving from a network node an indication indicating in which time instant and/or for how many time instants the terminal device has the capability of transmitting the uplink signal on physical control channel coherently.

In some embodiments, the method may further comprise: receiving from a network node an indication indicating between which hops of a frequency hopping pattern the terminal device has the capability of transmitting the uplink signal on physical control channel coherently.

In some embodiments, the capability of transmitting the uplink signal on physical control channel in at least the first time instant and the second time instant coherently may have one or more capability levels, and a number of time instants in which the terminal device has the capability is defined for each capability level. In some embodiments, the number of time instants may be defined for each capability level according to one or more of the following parameters: a numerology of an uplink control channel; a demodulation reference signal configuration of the uplink signal on physical control channel; a number of repetitions of the uplink signal on physical control channel; a format of the uplink signal on physical control channel; a number of orthogonal frequency division multiplexing, OFDM, symbols of the uplink signal on physical control channel in one slot; whether a resource allocated to the uplink signal on physical control channel is a dedicated or common resource; and a type of frequency hopping.

In some embodiments, a same hopping frequency may be used in the first time instant and the second time instant when a frequency hopping is enabled.

In some embodiments, the method may further comprise determining a frequency hopping pattern for the terminal device, wherein the capability of transmitting the uplink signal on physical control channel in at least the first time instant and the second time instant coherently is determined based on the frequency hopping pattern.

In some embodiments, the terminal device may be capable of keeping coherence in transmission in at least the first time instant and the second time instant.

In some embodiments, the method may further comprise: determining a first demodulation reference signal configuration for the first transmission of the uplink signal on physical control channel in the first time instant, and a second demodulation reference signal configuration for the transmission of the second uplink signal on physical control channel in the second time instant. At least one of the first demodulation reference signal configuration and the second demodulation reference signal configuration may indicate that no demodulation reference signal resource is configured for a corresponding transmission of the uplink signal on physical control channel.

In some embodiments, the first transmission of the uplink signal on physical control channel may have a same length as the second transmission of the uplink signal on physical control channel, and in at least one of the first transmission of the uplink signal on physical control channel and the second transmission of the uplink signal on physical control channel. At least part of symbols reserved for a demodulation reference signal may be utilized for uplink control information bits or dummy bits.

In some embodiments, the first transmission of the uplink signal on physical control channel may include first uplink control information with a same size as second uplink control information included in the second transmission of the uplink signal on physical control channel. Each of the first transmission of the uplink signal on physical control channel and the second transmission of the uplink signal on physical control channel may be performed in continuous symbols in a corresponding time instant.

In some embodiments, the first transmission of the uplink signal on physical control channel includes first uplink control information, and the second transmission of the uplink signal on physical control channel includes second uplink control information. A size of the first uplink control information and a size of the second uplink control information may be respectively determined according to corresponding demodulation reference signal configuration and a number of available uplink symbols in a corresponding time instant. In at least one of the first transmission of the uplink signal on physical control channel and the second transmission of the uplink signal on physical control channel, at least part of symbols reserved for a demodulation reference signal may be utilized for uplink control information bits.

In some embodiments, the first transmission of the uplink signal on physical control channel and the second transmission of the uplink signal on physical control channel may be performed within a span which consists of a group of continuous uplink symbols.

In some embodiments, at least one of the first transmission of the uplink signal on physical control channel and the second transmission of the uplink signal on physical control channel may be segmented at a slot border inside a span.

In some embodiments, the method may further comprise: determining whether at least one of the first transmission of the uplink signal on physical control channel and the second transmission of the uplink signal on physical control channel is allowed to cross multiple spans or not. If at least one of the first transmission of the uplink signal on physical control channel and the second transmission of the uplink signal on physical control channel is not allowed to cross multiple spans, the method may further comprise: determining a number of transmissions of the uplink signal on physical control channel in a span based on at least one of available uplink symbols in the span and a length of the uplink signal on physical control channel. If at least one of the first transmission of the uplink signal on physical control channel and the second transmission of the uplink signal on physical control channel is allowed to cross multiple spans, the method may further comprise: determining a number of spans needed for the first transmission of the uplink signal on physical control channel and the second transmission of the uplink signal on physical control channel, at least based on a number of transmissions of the uplink signal on physical control channel and a length of a transmission of the uplink signal on physical control channel; and/or determining a minimum number of symbols for a transmission of the uplink signal on physical control channel in a span, at least based on a number of available uplink symbols of a span and a length of a transmission of the uplink signal on physical control channel.

In some embodiments, the first transmission of the uplink signal on physical control channel and the second transmission of the uplink signal on physical control channel may be performed continuously within one or more spans.

In some embodiments, the method may further comprise: determining one or more symbols in a span which are configured as unavailable for a transmission of the uplink signal on physical control channel.

In some embodiments, the method may further comprise: determining locations of demodulation reference signals for at least one of the first transmission of the uplink signal on physical control channel and the second transmission of the uplink signal on physical control channel, wherein the locations are configured based on a transmission of the uplink signal on physical control channel and/or based on each segment of the uplink signal on physical control channel. The locations of demodulation reference signals in a segment may be configured according to at least one of the following factors: a length of the segment, whether there is an additional demodulation reference signal or not, and if frequency hopping is enabled.

In some embodiments, the method may further comprise: determining a maximum number of transmissions of the uplink signal on physical control channel, which is larger than a specific value.

In some embodiments, the method may further comprise: receiving from a network node, an indication of a number of transmissions of the uplink signal on physical control channel.

In some embodiments, the first transmission of the uplink signal on physical control channel and the second transmission of the uplink signal on physical control channel may be configured for hybrid automatic repeat request feedback of message 4 or message B. The first transmission of the uplink signal on physical control channel and the second transmission of the uplink signal on physical control channel may be configured and/or activated in one or more of the following ways: configured and activated with system information block 1, SIB1; configured with SIB1 and activated with dedicated signaling; and configured and activated with dedicated signaling. The dedicated signaling may be sent in one or more of the following: a downlink shared channel for message 4 or message B; downlink control information scheduling message 4 or message B; and dedicated radio resource control signaling when the terminal device is in connected mode.

In a second aspect of the present disclosure, there is provided a method for transmitting uplink signal on physical control channel. The method comprises: splitting uplink control information bits into a first part and a second part; transmitting the first part in a first uplink signal on physical control channel in a flexible slot, the flexible slot comprising both uplink symbols and downlink symbols; and transmitting the second part in a second uplink signal on physical control channel in at least one uplink slot following the flexible slot.

In some embodiments, the uplink control information bits may be split into the first part and the second part based on: types of the uplink control information bits, and/or a number of uplink symbols in the flexible slot.

In some embodiments, the method may further comprise: transmitting a repetition of the first uplink signal on physical control channel in a subsequent flexible slot; and transmitting a repetition of the second uplink signal on physical control channel in subsequent at least one uplink slot.

In some embodiments, the first uplink signal on physical control channel and the second uplink signal on physical control channel may be transmitted according to a format of uplink signal on physical control channel, which is defined by utilizing uplink symbols in the flexible slot and symbols in the at least one uplink slot.

In a third aspect of the present disclosure, there is provided a method for receiving an uplink signal on physical control channel. The method comprises: determining that a terminal device has a capability of transmitting the uplink signal on physical control channel in at least a first time instant and a second time instant coherently; receiving from the terminal device, a first transmission of the uplink signal on physical control channel in the first time instant in a first set of subcarriers; and receiving from the terminal device, a second transmission of the uplink signal on physical control channel in the second time instant in a second set of subcarriers.

In some embodiments, the second transmission of the uplink signal on physical control channel may be a repetition of the first transmission of the uplink signal on physical control channel.

In some embodiments, the method may further comprise: performing channel estimation by coherently combining the first transmission of the uplink signal on physical control channel and the second transmission of the uplink signal on physical control channel.

In some embodiments, the capability of transmitting the uplink signal on physical control channel in at least the first time instant and the second time instant coherently may comprise a capability of transmitting the uplink signal on physical control channel in at least the first time instant and the second time instant with a phase-related difference lower than a threshold.

In some embodiments, the method may further comprise: receiving from the terminal device, an indication indicating that the terminal device has the capability of transmitting the uplink signal on physical control channel in at least the first time instant and the second time instant coherently.

In some embodiments, each of the first time instant and the second time instants may comprise: one or more slots; and/or one or more sub-slots; and/or one or more multiple-slots. The second time instant may immediately follow the first time instant.

In some embodiments, the capability of transmitting the uplink signal on physical control channel in at least the first time instant and the second time instant coherently may be determined based on at least one of the following: whether the first time instant and the second time instant are consecutive; a change in transmission power between the first time instant and the second time instant; a frequency offset between a central frequency of the first set of subcarriers and a central frequency of the second set of subcarriers; and an uplink spatial relation between uplink control channel transmissions in the first time instant and the second time instant.

In some embodiments, the method may further comprise: receiving from the terminal device, an indication indicating a number of time instants in which the terminal device has the capability of transmitting the uplink signal on physical control channel coherently.

In some embodiments, the method may further comprise: determining in which time instant and/or for how many time instants the terminal device has the capability of transmitting the uplink signal on physical control channel coherently; and transmitting to the terminal device, the indication indicating in which time instant and/or for how many time instants the terminal device has the capability of transmitting the uplink signal on physical control channel coherently.

In some embodiments, the method may further comprise: determining, between which hops of a frequency hopping pattern the terminal device has the capability of transmitting the uplink signal on physical control channel coherently; and transmitting to the terminal device, an indication indicating between which hops of a frequency hopping pattern the terminal device has the capability of transmitting the uplink signal on physical control channel coherently.

In some embodiments, the capability of transmitting the uplink signal on physical control channel in at least the first time instant and the second time instant coherently may have one or more capability levels, and a number of time instants in which the terminal device has the capability is defined for each capability level.

In some embodiments, wherein the number of time instants is defined for each capability level according to one or more of the following parameters: a numerology of an uplink control channel; a demodulation reference signal configuration of the uplink signal on physical control channel; a number of repetitions of the uplink signal on physical control channel; a format of the uplink signal on physical control channel; a number of orthogonal frequency division multiplexing, OFDM, symbols of the uplink signal on physical control channel in one slot; whether a resource allocated to the uplink signal on physical control channel is a dedicated or common resource; and a type of frequency hopping. In some embodiments, a same hopping frequency may used in the first time instant and the second time instant when a frequency hopping is enabled.

In some embodiments, the method may further comprise: determining a frequency hopping pattern for the terminal device, and wherein the capability of transmitting the uplink signal on physical control channel in at least the first time instant and the second time instant coherently is determined based on the frequency pattern.

In some embodiments, the method may further comprise: transmitting to the terminal device, a first demodulation reference signal configuration for the first transmission of the uplink signal on physical control channel in the first time instant, and a second demodulation reference signal configuration for the transmission of the second uplink signal on physical control channel in the second time instant.

In some embodiments, at least one of the first demodulation reference signal configuration and the second demodulation reference signal configuration may indicate that no demodulation reference signal resource is configured for a corresponding transmission of the uplink signal on physical control channel.

In some embodiments, the first transmission of the uplink signal on physical control channel may have a same length as the second transmission of the uplink signal on physical control channel. In at least one of the first transmission of the uplink signal on physical control channel and the second transmission of the uplink signal on physical control channel, at least part of symbols reserved for a demodulation reference signal are utilized for uplink control information bits or dummy bits.

In some embodiments, the first transmission of the uplink signal on physical control channel may include first uplink control information with a same size as second uplink control information included in the second transmission of the uplink signal on physical control channel. Each of the first transmission of the uplink signal on physical control channel and the second transmission of the uplink signal on physical control channel may be performed in continuous symbols in a corresponding time instant.

In some embodiments, the first transmission of the uplink signal on physical control channel may include first uplink control information and the second transmission of the uplink signal on physical control channel includes second uplink control information. A size of the first uplink control information and a size of the second uplink control information may be respectively determined according to corresponding demodulation reference signal configuration and a number of available uplink symbols in a corresponding time instant. In at least one of the first transmission of the uplink signal on physical control channel and the second transmission of the uplink signal on physical control channel, at least part of symbols reserved for a demodulation reference signal may be utilized for uplink control information bits.

In some embodiments, the first transmission of the uplink signal on physical control channel and the second transmission of the uplink signal on physical control channel may be received within a span which consists of a group of continuous uplink symbols.

In some embodiments, at least one of the first transmission of the uplink signal on physical control channel and the second transmission of the uplink signal on physical control channel may be segmented at a slot border inside a span.

In some embodiments, the method may further comprise: determining whether at least one of the first transmission of the uplink signal on physical control channel and the second transmission of the uplink signal on physical control channel is allowed to cross multiple spans or not.

In some embodiments, the method may further comprise: transmitting to the terminal device, an indication indicating whether at least one of the first transmission of the uplink signal on physical control channel and the second transmission of the uplink signal on physical control channel is allowed to cross multiple spans or not. If at least one of the first transmission of the uplink signal on physical control channel and the second transmission of the uplink signal on physical control channel is not allowed to cross multiple spans, the method may further comprise: determining a number of transmissions of the uplink signal on physical control channel in a span based on at least one of available uplink symbols in the span and a length of the uplink signal on physical control channel. If at least one of the first transmission of the uplink signal on physical control channel and the second transmission of the uplink signal on physical control channel is allowed to cross multiple spans, the method may further comprise: determining a number of spans needed for the first transmission of the uplink signal on physical control channel and the second transmission of the uplink signal on physical control channel, at least based on a number of transmissions of the uplink signal on physical control channel and a length of a transmission of the uplink signal on physical control channel; and/or determining a minimum number of symbols for a transmission of the uplink signal on physical control channel in a span, at least based on a number of available uplink symbols of a span and a length of a transmission of the uplink signal on physical control channel.

In some embodiments, the first transmission of the uplink signal on physical control channel and the transmission of the second uplink signal on physical control channel may be received continuously within a span. (Embodiment 1 in updated section 5.2.1).

In some embodiments, the method may further comprise: determining one or more symbols in a span which are configured as unavailable for a transmission of the uplink signal on physical control channel.

In some embodiments, the method may further comprise: determining locations of demodulation reference signals for at least one of the first transmission of the uplink signal on physical control channel and the second transmission of the uplink signal on physical control channel, wherein the locations are configured based on a transmission of the uplink signal on physical control channel and/or based on each segment of the uplink signal on physical control channel.

In some embodiments, the method may further comprise: determining a maximum number of transmissions of the uplink signal on physical control channel, which is larger than a specific value. The locations of demodulation reference signals in a segment may be configured according to at least one of the following factors: a length of the segment, whether there is an additional demodulation reference signal or not, and if frequency hopping is enabled.

In some embodiments, the method may further comprise: transmitting to the terminal device, an indication of a number of repetitions of the uplink signal on physical control channel.

In some embodiments, the first transmission of the uplink signal on physical control channel and the second transmission of the uplink signal on physical control channel may be configured for hybrid automatic repeat request feedback of message 4 or message B. The first transmission of the uplink signal on physical control channel and the second transmission of the uplink signal on physical control channel may be configured and/or activated in one or more of the following ways: configured and activated with system information block 1, SIB1; configured with SIB1 and activated with dedicated signaling; and configured and activated with dedicated signaling. The dedicated signaling is sent in one or more of the following ways: a downlink shared channel for message 4 or message B; downlink control information scheduling message 4 or message B; and dedicated radio resource control signaling when the terminal device is in connected mode.

In a fourth aspect of the present disclosure, there is provided a method for receiving uplink signal on physical control channel. The method comprises: receiving a first part of uplink control information bits in a first uplink signal on physical control channel in a flexible slot, the flexible slot comprising both uplink symbols and downlink symbols; and receiving a second part of the uplink control information bits in a second uplink signal on physical control channel in at least one uplink slot following the flexible slot.

In some embodiments, the uplink control information bits may be split into the first part and the second part based on: types of the uplink control information bits, and/or a number of uplink symbols in the flexible slot.

In some embodiments, the method may further comprise receiving a repetition of the first uplink signal on physical control channel in a subsequent flexible slot; and receiving a repetition of the second uplink signal on physical control channel in subsequent at least one uplink slot.

In some embodiments, the first uplink signal on physical control channel and the second uplink signal on physical control channel may be received according to a format of uplink signal on physical control channel, which is defined by utilizing uplink symbols in the flexible slot and symbols in the at least one uplink slot.

In a fifth aspect of the present disclosure, there is provided an apparatus. The apparatus may comprise a processor and a memory coupled to the processor. The memory may contain instructions executable by the processor, whereby the apparatus is operative to perform any step of the method according to the first aspect of the disclosure.

In a sixth aspect of the present disclosure, there is provided an apparatus. The apparatus may comprise a processor and a memory coupled to the processor. The memory may contain instructions executable by the processor, whereby the apparatus is operative to perform any step of the method according to the second aspect of the disclosure.

In a seventh aspect of the present disclosure, there is provided an apparatus in a fourth network node. The apparatus may comprise a processor and a memory coupled to the processor. The memory may contain instructions executable by the processor, whereby the apparatus is operative to perform any step of the method according to the third aspect of the disclosure In an eighth aspect of the present disclosure, there is provided an apparatus in a third network node. The apparatus may comprise a processor and a memory coupled to the processor. The memory may contain instructions executable by the processor, whereby the apparatus is operative to perform any step of the method according to the fourth aspect of the disclosure.

In a ninth aspect of the present disclosure, there is provided a computer-readable medium having computer program codes embodied thereon which, when executed on a computer, cause the computer to perform any step of the method according to the first aspect of the present disclosure.

In a tenth aspect of the present disclosure, there is provided a computer-readable medium having computer program codes embodied thereon which, when executed on a computer, cause the computer to perform any step of the method according to the second aspect of the present disclosure.

In an eleventh aspect of the present disclosure, there is provided a computer-readable medium having computer program codes embodied thereon which, when executed on a computer, cause the computer to perform any step of the method according to the third aspect of the present disclosure.

In a twelfth aspect of the present disclosure, there is provided a computer-readable medium having computer program codes embodied thereon which, when executed on a computer, cause the computer to perform any step of the method according to the fourth aspect of the present disclosure.

According to the various aspects and embodiments as mentioned above, it can support cross-slot channel estimation accurately and effectively.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIGS. 14A and 14B are block diagrams illustrating apparatus according to some embodiments of the present disclosure;

FIGS. 15A and 15B are block diagram illustrating apparatus according to some embodiments of the present disclosure;

DETAILED DESCRIPTION

Figure 1:
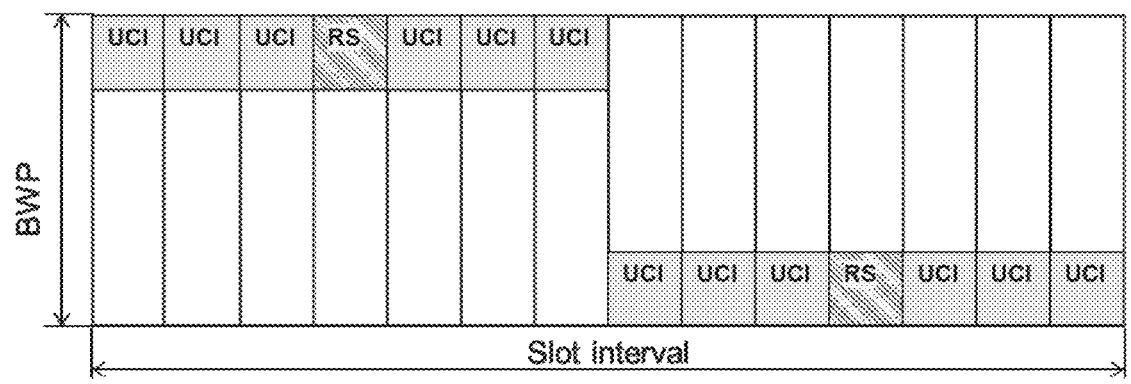
FIG. 1 illustrates two PUCCH formats, respectively.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "terminal device" refers to any end device that can access a communication network and receive services therefrom. By way of example and not limitation, the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

In the following description and claims, unless defined otherwise, all technical and scientific terms used herein have the same meaning as commonly understood by one of ordinary skills in the art to which this disclosure belongs. For example, the term "terminal device" used herein may refer to any terminal device or user equipment (UE) having wireless communication capabilities, including but not limited to, mobile phones, cellular phones, smart phones, or personal digital assistants (PDAs), portable computers, image capture devices such as digital cameras, gaming devices, music storage and playback appliances, wearable devices, vehicle-mounted wireless device and the like. In the following description, the terms "terminal device", "user equipment" and "UE" may be used interchangeably. Similarly, the term "network node" may represent any NF in 5G core network.

An uplink signal can be transmitted on a physical control channel according to a predefined format. For example, in new radio (NR) of Release 15 and Release 16, several formats are specified for PUCCH configuration. For example, a PUCCH configuration of format 2 comprises:

(1) frequency Division Multiplexing (FDM) between encoded uplink control information (UCI) and demodulation reference signal (DMRS);

(2) UCI is encoded with Reed-Muller (RM) codes (when a size of UCI is not larger than 11 bits) or Polar codes (when a size of UCI and Cyclic Redundancy Check (CRC) is larger than 11 bits) and scrambled;

(3) the number of contiguous PRBs used for PUCCH is determined by
Configuration (upper bound), and/or
UCI payload and configured max code rate;
(4) the number of DMRS resource elements (REs) per physical resource block (PRB) is 4 (REs 1, 4, 7, and 10),
The DMRS are the same as the Pseudo-Noise (PN) sequences of physical uplink shared channel (PUSCH) DMRS;
(5) simultaneous transmission of Ack/Nack (with/without scheduling request (SR)) and channel state information (CSI),
Ack/Nack and CSI are jointly encoded not exceeding the configured max code rate using the configured PRBs; and
(6) CSI is dropped if needed following CSI omission rules for CSI on PUCCH.

For example, a PUCCH configuration of format 3 comprises:
(1) 4-14 symbols long and multiple PRB wide (per frequency-hop);
(2) DMRS and UCI symbols are time division multiplexed to maintain low peak to average power ratio (PAPR);
(3) UCI bits are encoded (with Reed-Muller (RM) codes (when a size of UCI is not larger than 11 bits) or Polar codes (when a size of UCI and CRC is larger than 11 bits)), scrambled, and transmitted using DFTS-OFDM (Discrete Fourier Transform Spread-Orthogonal Frequency Division Multiplexing) in UCI symbols;
(4) DMRS symbols are constant amplitude zero autocorrelation (CAZAC) sequences;
(5) frequency-hopping with one hop within the active uplink bandwidth part (BWP) for the UE is supported;
(6) UCI multiplexing using PUCCH format 3 or 4;
(7) simultaneous transmission of Aack/Nack and SR;
(8) similar to format 2, a bit appended to Aack/Nack for the state of SR and all bits are jointly encoded;
(9) Simultaneous transmission of Ack/Nack (with/without SR) and CSI;
(10) Ack/Nack (and SR) and CSI part 1 are jointly encoded using configured max code rate, CSI part 2 is separately encoded using the remaining resources;
(11) the code rate should not exceed a max code rate;
(12) CSI is dropped if needed following CSI omission rules for CSI on PUSCH; and
(13) the modulated symbols of high priority UCI (Aack/Nack+CSI Part 1 or CSI Part 1), are mapped around DMRS, in a "frequency first, time second" manner, as symmetric as possible, the remaining resources are used for the modulated symbols of lower priority UCI (CSI Part 2).

For example, a PUCCH configuration of format 4 comprises:
(1) Long-PUCCH for moderate UCI payload with multiplexing capacity is supported based on pre-DFT (Discrete Fourier Transform) OCC (Orthogonal Cover Code),
same structure as PUCCH format 3 but with multi-user multiplexing,
only one PRB,
maximum 4 users can be multiplexed over one PRB using pre-DFT spreading code,
cyclic shift of DMRS is chosen from $\{0, 3, 6, 9\}$ using the pre-DFT spreading code index.

FIG. 1 illustrates two PUCCH formats of long PUCCH with 14 symbols and 10 symbols in one slot interval, respectively.

NR Release 15 supports slot aggregation of PUCCH signals, as specified in Chapter 9.2.6 of 3GPP TS 38.213 v.15.9.0. UCI can be repeated over a certain number (e.g. 2 or 4 or 8, denoted with a parameter nrofSlots) of slots. All UCI bits are transmitted in every slot and repeated. A repetition of a transmission of a PUCCH signal can be called as PUCCH repetition, hereinafter. Each PUCCH repetition may have a same duration or length (e.g. denoted as nrofSymbols) and a starting symbol in each slot (denoted as startingSymbolIndex). Inter-slot hopping and intra-slot hopping are supported, but not simultaneously. PUCCH repetitions of format 1, 3, 4 can be configured separately. In an example, PUCCH repetitions can be configured by using PUCCH-Config information element, as specified in 3GPP TS 38.331 v15.6.0 as follows.

| PUCCH-Config information element |
| --- |
| PUCCH-FormatConfig ::= SEQUENCE { <br>   interslotFrequencyHopping     ENUMERATED {enabled}    OPTIONAL,    -- Need R<br>   additionalDMRS                    ENUMERATED {true}       OPTIONAL,    -- Need R<br>   maxCodeRate                       PUCCH-MaxCodeRate       OPTIONAL,    -- Need R<br>   nrofSlots                            ENUMERATED {n2,n4,n8}   OPTIONAL,    -- Need S<br>   pi2BPSK                            ENUMERATED {enabled}    OPTIONAL,    -- Need R<br>   simultaneousHARQ-ACK-CSI    ENUMERATED {true}       OPTIONAL     -- Need R<br>} |

The field of nrofSlots indicates a number of slots with the same PUCCH format (e.g. PUCCH format 1, format 3 or format 4). It is also the number of PUCCH repetitions, with one repetition is scheduled with one slot. When the field is absent, the UE can apply a default value n1. In some examples, the field is not applicable for format 2.

If a UE determines that, for a transmission of a PUCCH repetition in a slot, the number of symbols available in one slot is smaller than the value provided by nrofSymbols for a corresponding PUCCH format of the transmission, the UE does not transmit the PUCCH repetition in the slot.

If a UE is provided with a semi-statically configured TDD (Time Divisional Duplex) pattern, PUCCH is only mapped to slots that have uplink or flexible symbols at the allocated PUCCH resource location. That is, slots don't have to be contiguous.

Figure 2:
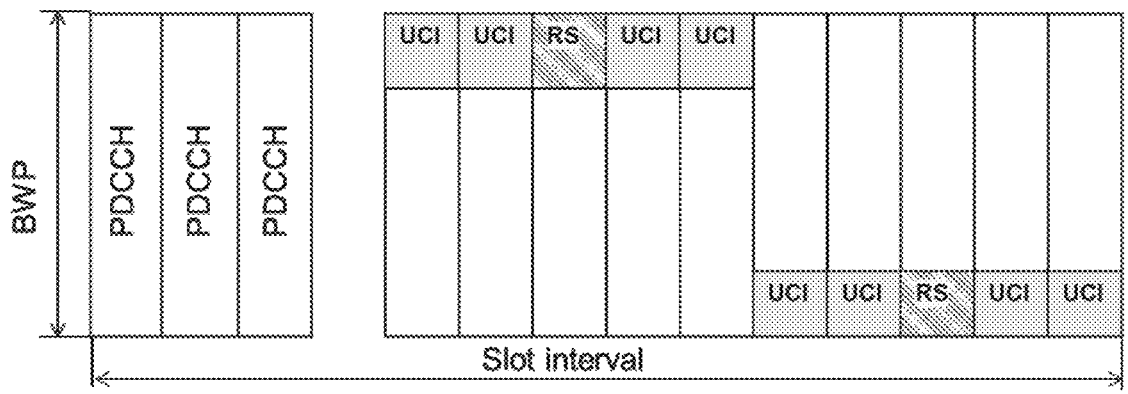
FIG. 2 illustrates exemplary transmissions of a multi-slot PUCCH repetition overlapping with a single/multi-slot PUSCH repetition in time.
Figure 2:
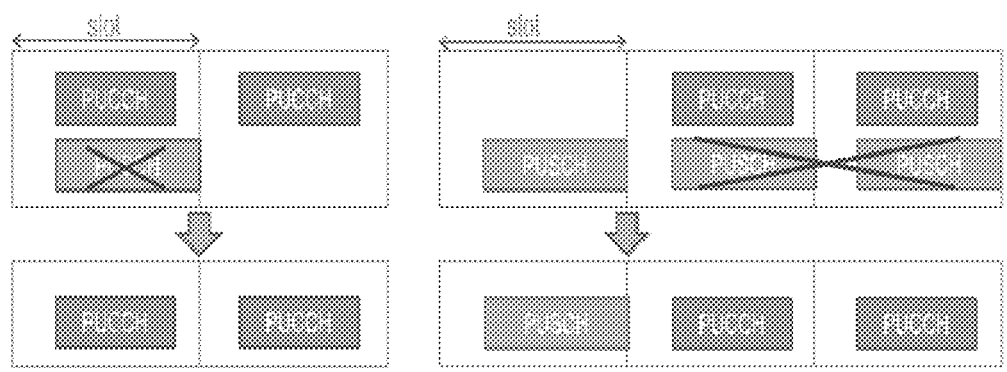

When a multi-slot PUCCH repetition overlap with a single/multi-slot PUSCH repetition in time, the PUSCH repetition can be dropped without deferral in overlapping slots if the timeline requirement within overlapping slots is met. Otherwise, it is considered as the error case for overlapping slots. FIG. 2 illustrates on the left, an example of a multi-slot PUCCH repetition overlap with a single-slot PUSCH repetition in timeslots. FIG. 2 illustrates on the right, an example of a multi-slot PUCCH repetition overlap with a multi-slot PUSCH repetition in timeslots. As shown in FIG. 2, the PUSCH repetition is dropped.

A UE does not multiplex UCIs of different UCI types in a PUCCH transmission with repetitions over a certain number (denoted as $N_{PUCCH}^{repeat}$) of slots. $N_{PUCCH}^{repeat}$ can be predefined (e.g. specified in a standard), and $N_{PUCCH}^{repeat} > 1$. If a UE is to transmit two PUCCH signals with each in one or more slots and the transmissions of the two PUCCH signals overlap in some of the one or more slots, then the transmissions can be performed according to a number of the slots and a UCI type priority of UCI in corresponding PUCCH signals. The UCI type priority is ranked from high to low as follows: HARQ-ACK, SR, CSI with a higher priority, CSI with a lower priority. A UE would transmit a PUCCH signal that includes UCI bits with a higher UCI type priority and would not transmit a PUCCH signal that includes UCI bits with a lower UCI type priority. If two PUCCH signals include UCI bits with a same UCI type priority, the UE would transmit a PUCCH signal starting at an earlier slot.

Currently, the PUCCH resource can be common resources specifically configured for message (Msg) 4 or message (MsgB) HARQ feedback in 4-step random access procedure or 2-step random access procedure, respectively, when dedicated PUCCH resources are not available. In this case, only PUCCH format 0 or format 1 will be used, PUCCH repetition is not supported.

As discussed above, PUCCH for a UE in RRC connected state has been identified as one of the bottlenecks of cell coverage. In NR Release 15, a PUCCH repetition has been supported. However, there are still some restrictions, such as the maximum number of PUCCH repetitions, channel estimation done inside a slot, only one PUCCH repetition in a slot, no specific method to improve performance of PUCCH for Msg4/B HARQ-ACK feedback, and the like.

For UEs at a cell edge, a SNR (Signal-to-noise ratio) in each PUCCH repetition is quite low. It means that a channel estimation error might be big, especially when DMRS resources used for a channel estimation are limited. In this case, cross-slot channel estimation may be needed to improve the channel estimation accuracy, so as to improve a performance of a PUCCH receiver.

Therefore, it is desirable to provide a new mechanism to support cross-slot channel estimation for transmissions on a physical control channel (e.g. PUCCH), and to overcome the above-mentioned problems. In the present disclosure, methods, apparatus and computer program products are provided to improve performances of transmissions on a physical control channel, with respect to a support to cross-slot channel estimation. The support covers a determination of cross-slot channel estimation capability for a UE, e.g. UE requirements on a number of slots that can be expected to be used to do cross channel estimation. The support can further cover a DMRS configuration and the frequency hopping patterns design when cross-slot channel estimation is applied. With these supports, cross-slot channel estimation can ensure a better accuracy of channel estimation in a certain radio channel condition.

Cross-slot channel estimation can be used for multiple PUCCH repetitions across slots. Each of the multiple PUCCH repetitions can be scheduled in one or more slots. For uplink channel estimation, a network node (e.g. gNB), as a receiver, needs to know if cross-slot channel estimation is possible, e.g. whether a phase continuity is guaranteed for DMRS across slots by UE), in order for joint channel estimation if a blind demodulation is not expected. In some embodiments, the multiple PUCCH repetitions from one UE may be transmitted in one slot. In this case, one PUCCH repetition from the UE is scheduled in a part of continuous symbols within one slot, which is referred to as sub-slot hereinafter. For example, the PUCCH repetition may be of a short PUCCH format. The network node (e.g. gNB) can do joint channel estimation among multiple PUCCH repetitions in one slot. This can be called as cross-PUCCH channel estimation in one slot. In the present disclosure, for the sake of concise description, a term of "cross-slot channel estimation" is used, but this term also covers cross-PUCCH channel estimation in one slot.

In order for the network node (e.g. gNB) to improve its cross-slot channel estimation by coherently combining multiple transmissions from a UE, it is desired that the network node is aware that the UE will transmit the multiple transmissions coherently. For example, it is preferable that the gNB can determine or be indicated that the UE will minimize a phase difference between its multiple PUCCH repetitions. In this regard, the UE can transmit an indication of its capability of transmitting the multiple PUCCH repetitions coherently, to the network node. Alternatively, UE's such capability can be specified in a specification of a communication standard or an industry standard. The capability can comprise a capability of controlling relative phase between transmissions of the multiple PUCCH repetitions. Various aspects of the new mechanism for supporting cross-slot channel estimation for PUCCH are developed in more details with reference to the following embodiments.

In one embodiment, for coherent transmission in a UE over time, the UE may indicate to a network the capability requirement that the UE is or should be capable to perform transmission in at least a first time instant and a second time instant on a same antenna port with a limited difference in phase. Alternatively, this capability requirement may be defined in a specification of an industry/communication standard. The UE transmits a first content in the first time instant on the same antenna port in a first set of subcarriers. The UE transmits a second content in the second time instant on the same antenna port in a second set of subcarriers, such that a phase difference between each of the subcarriers in the second set and each of the subcarriers in the first set is no more than a predetermined phase difference. Each of the first content and the second content may be at least one of a physical channel and a physical signal. For example, the first content and the second content may be PUCCH repetitions.

In some embodiments, the first set of subcarriers and the second set of subcarriers may be the same.

In some embodiments, the first content and the second content may be a same content.

In some embodiments, the second time instant may immediately follow the first time instant.

In some embodiments, the UE may transmit in the first time instant and the second time instant when the UE is scheduled on a plurality of carriers.

In some embodiments, the UE may receive from a network node, an indication indicating that a transmission of the first content in the first time instant and a transmission of the second content in the second time instant is performed with at least one of a same power level and a same precoder. The indication may be a signaling from the network node.

In some embodiments, the UE may receive from a network node, an indication identifying the first time instant and the second time instant out of a plurality of time instants. The indication may be a signaling from a network node.

Though embodiments of the present disclosure can be implemented in an exemplary access network of 5G NR, it would be appreciated that embodiments of the disclosure are not limited to such access network. For illustrative purposes, several embodiments of the present disclosure will be described in the context of PUCCH configurations with some specific parameters and specific parameter values. Those skilled in the art will appreciate, however, that the specific parameter values are utilized as examples, and the concept and principle of the several embodiments of the present disclosure may be more generally applicable to other parameters and parameter values.

It is noted that some embodiments of the present disclosure are mainly described in relation to 5G specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

Figure 3:
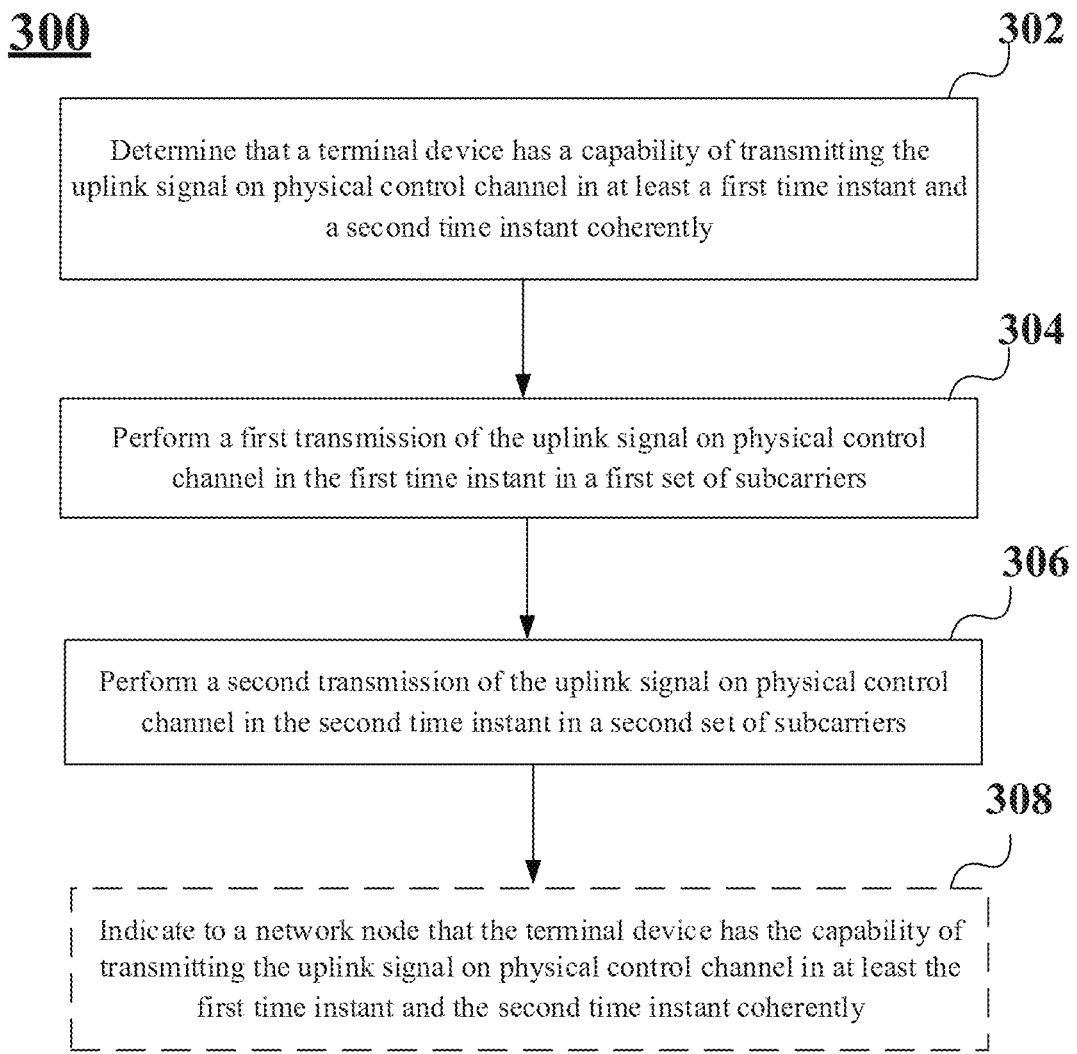
FIG. 3 illustrates a flowchart of a method for transmitting an uplink signal on physical control channel according to some embodiments of the present disclosure.

Reference is now made to FIG. 3, which shows a flowchart of a method 300 for transmitting an uplink signal on physical control channel according to some embodiments of the present disclosure. The method 300 may be implemented at a terminal device (e.g., a UE). As shown in FIG. 3, the method 300 may comprise: determining that a terminal device has a capability of transmitting the uplink signal on physical control channel in at least a first time instant and a second time instant coherently, at block 302; performing a first transmission of the uplink signal on physical control channel in the first time instant in a first set of subcarriers, at block 304; and performing a second transmission of the uplink signal on physical control channel in the second time instant in a second set of subcarriers, at block 306.

In some embodiments, the method 300 may further comprise: indicating to a network node that the terminal device has the capability of transmitting the uplink signal on physical control channel in at least the first time instant and the second time instant coherently, at block 308.

Figure 4:
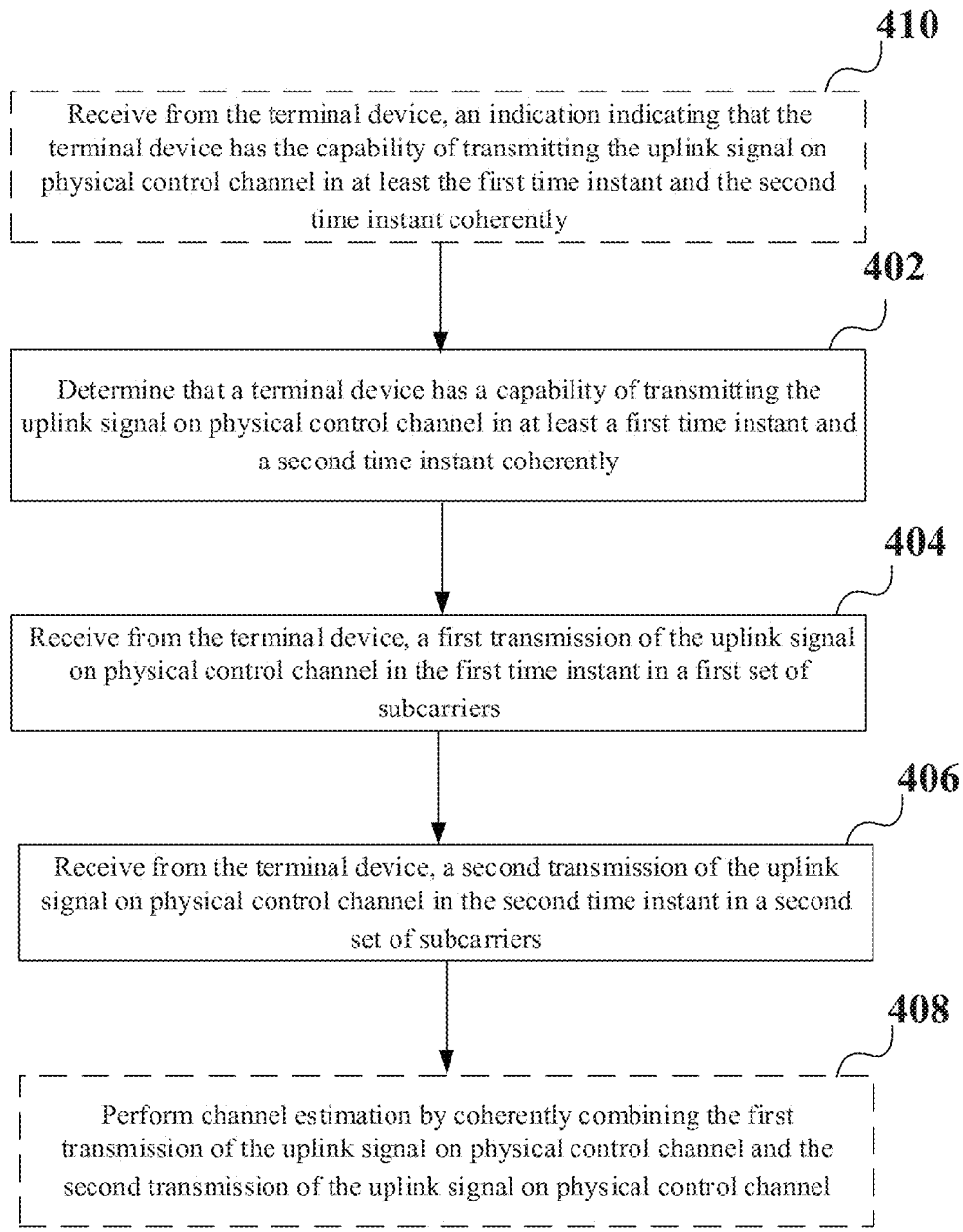
FIG. 4 illustrates a flowchart of a method for receiving an uplink signal on physical control channel according to some embodiments of the present disclosure.

FIG. 4 illustrates a flowchart of a method 400 for receiving an uplink signal on physical control channel according to some embodiments of the present disclosure. The method 400 may be implemented at a network node (e.g., a gNB). As shown in FIG. 4, the method 400 may comprise: determining that a terminal device has a capability of transmitting the uplink signal on physical control channel in at least a first time instant and a second time instant coherently, at block 402; receiving from the terminal device, a first transmission of the uplink signal on physical control channel in the first time instant in a first set of subcarriers, at block 404; and receiving from the terminal device, a second transmission of the uplink signal on physical control channel in the second time instant in a second set of subcarriers, at block 406.

In some embodiments, the method 400 may further comprise performing channel estimation by coherently combining the first transmission of the uplink signal on physical control channel and the second transmission of the uplink signal on physical control channel, at block 408.

In some embodiments, the method 400 may further comprise receiving from the terminal device, an indication indicating that the terminal device has the capability of transmitting the uplink signal on physical control channel in at least the first time instant and the second time instant coherently, at block 410.

The second transmission of the uplink signal on physical control channel can be a repetition of the first transmission of the uplink signal on physical control channel.

The capability of transmitting the uplink signal on physical control channel in at least the first time instant and the second time instant coherently can comprise a capability of transmitting the uplink signal on physical control channel in at least the first time instant and the second time instant with a phase-related difference lower than a threshold. A phase-related difference may include at least one of a difference in phase, a difference in phase error, and an error of phase difference. The difference of phase means a phase difference between two transmissions. The difference in phase error means a phase error difference between two transmissions. The error of phase difference means an error of the phase difference between two transmissions.

Each of the first time instant and the second time instant may comprise: one or more slots, and/or one or more sub-slots, and/or one or more multiple-slot. A sub-slot consists of one or more continuous uplink symbols within a slot. A multiple-slot consists of one or more continuous uplink slots. In some embodiments, the second time instant may immediately follow the first time instant.

A UE may have different capabilities of keeping phase continuity across time instants, especially non-continuous slots. Besides time instants, another factor impacting phase is the UE's transmission power. Some UEs may have a multi-stage power amplifier (PA) and one local oscillator. Therefore, for such UEs, uplink transmission phase may change when uplink transmission power leads to a switch among PA of multiple stages. Frequency offset from a central frequency of BWP and uplink spatial relation may also impact phase continuity in the transmissions across the first and second time instants.

As such, in some embodiments, the capability of transmitting the uplink signal on physical control channel in at least the first time instant and the second time instant coherently is determined based on at least one of the following factors: whether the first time instant and the second time instant are consecutive; a change in transmission power between the first time instant and the second time instant; a frequency offset between a central frequency of the first set of subcarriers and a central frequency of the second set of subcarriers; and an uplink spatial relation between uplink control channel transmissions in the first time instant and the second time instant. A UE can report its capability of supporting cross-slot channel estimation to gNB.

In a scenario, a UE may determine that its transmissions of the uplink signal in at least the first time instant and the second time instant can be performed with a same allocated PRB, a same UL transmission power and a same uplink spatial relation. In one example, the UE may determine that in this scenario, it is unable to keep phase continuity across a certain number (e.g. denoted as X) of consecutive slots. The value of X may be predefined, e.g. X=1, 2, 3, or 4. The UE can also indicate the number X to gNB. When X=1, it may indicate a capability of keeping phase continuity across multiple PUCCH in one slot. In another example, the UE may determine that in this scenario, it is able to keep phase continuity across at most X consecutive slots, but is unable to keep phase continuity between non-continuous slots. In yet another example, the UE may determine that in this scenario, it is able to keep phase continuity across slots no matter the slots are continuous or not.

In another scenario, the UE may determine that transmissions of the uplink signal in at least the first time instant and the second time instant can be performed with different uplink transmission powers, a same allocated PRB and a same spatial relation. In one example, the UE may determine that in this scenario the UE is unable to keep phase continuity if the uplink transmission power changes during the time instants. In another example, the UE may determine that in this scenario, UE is able to keep phase continuity, if the uplink transmission power change during the time instants is within a range so that there is no switch of PA stage. For example, a maximum power change for keeping phase continuity can be set. For example, the maximum power change may be 3 dB, which means if its transmission power increases no more than 3 dB, a same phase can be remained. The UE can also indicate this maximum power change to a gNB, so that the gNB is able to determine the UE's capability of keeping phase continuity. In yet another example, the UE may determine that in this scenario, the UE is able to keep phase continuity regardless of transmission power difference.

In another scenario, the UE may determine that transmissions of the uplink signals in at least the first time instant and the second time instant can be performed with a same transmission power and a same uplink spatial relation. The UE can report to a gNB, a range with respect to UE's phase rotation in terms of the frequency difference between central frequencies of the BWPs and allocated PUCCH PRBs for respective transmissions. For example, a ratio between the phase rotation and the frequency difference can be reported. It may indicate that if its phase rotation increases no more than the radio, the phase continuity can be remained.

Slots for cross-slot PUCCH channel estimation can be those scheduled for multiple PUCCH repetitions, or for a PUCCH repetition from one UE separately scheduled in one or multiple slots. In latter case, each PUCCH repetition can be scheduled with its own precoder and/or uplink spatial relation.

Besides factors in time and power domains, phase continuity between DMRS of multiple slots puts some other restraints to make cross-slot channel estimation possible. For example, UE may need to keep the same spatial transmission filter for PUCCH across multiple slots.

In some embodiments, a UE can ignore transmit power changes between slots that are a part of a PUCCH repetition.

In some embodiments, a UE can determine in which time instant and/or for how many time instants the terminal device has the capability of transmitting the uplink signal on physical control channel coherently. In an example, the UE can determine in which slots/repetitions or for how many slots/repetitions it needs to keep phase continuity. If frequency hopping is enabled, the UE can determine between which certain hops using the same PRB it needs to keep phase continuity. For example, a default setting could be phase coherency across all repetitions. If it is out of UE capability, then a specific smaller number of slots for keeping phase continuity is configured. In some embodiments, the UE can receive from a network device (e.g. gNB), an indication indicating in which time instant and/or for how many time instants the terminal device has the capability of transmitting the uplink signal on physical control channel coherently, and/or an indication indicating between which hops of a frequency hopping pattern the terminal device has the capability of transmitting the uplink signal on physical control channel coherently. For example, these slots/repetitions and/or hops can be configured by gNB via RRC/L1 signaling.

In some embodiments, the capability of transmitting the uplink signal on physical control channel in at least the first time instant and the second time instant coherently has one or more capability levels. In an example, the UE can report its capability level to a gNB, with 1 bit for example. For each capability level, a number of time instants in which the terminal device has the capability is defined. The number of time instants (also referred to as coherent slots, hereinafter) can be defined for each capability level according to one or more of the following factors:

a numerology of an uplink control channel: for example, in a case of a higher sub-carrier space, more coherent slots can be required, since the higher sub-carrier space is shorter;

a demodulation reference signal configuration of the uplink signal on physical control channel: for example, whether there is additional DMRS or not, e.g. with more DMRS configured per slot, less number of coherent slots can be required (since channel estimation per slot is enough);

a number of repetitions of the uplink signal on physical control channel;

a format of the uplink signal on physical control channel;

a number of orthogonal frequency division multiplexing, OFDM, symbols of the uplink signal on physical control channel in one slot;

whether a resource allocated to the uplink signal on physical control channel is a dedicated or common resource; and a type of frequency hopping.

As an example, for PUCCH format 3 and 4, two different levels of cross-slot coherency capability can be defined in the two tables below. For each capability level, a required number of coherent slots can be defined for different sub-carrier spacing (represented as u) and different number of DMRS symbols.

TABLE 1 number of coherent slots for cross-slot coherency capability 1

| | number of coherent slots $S_1$ [slots] | |
|---|---|---|
| μ | No additional DMRS | Additional DMRS |
| 0 | 2 | 1 |
| 1 | 4 | 2 |
| 2 | 6 | 4 |
| 3 | 8 | 6 |

TABLE 2 number of coherent slots for cross-slot coherency capability 2

| | number of coherent slots $S_1$ [slots] | |
|---|---|---|
| μ | No additional DM-RS | Additional DM-RS |
| 0 | 4 | 2 |
| 1 | 6 | 4 |
| 2 | 8 | 6 |
| 3 | 10 | 8 |

A number of DMRS symbols for a PUCCH transmission using PUCCH format 3 or format 4 can be provided by a higher layer parameter additionalDMRS.

In some embodiments, coherent slots can additionally be limited to slots using a same hopping frequency (i.e. a same PRB allocation). The slots using a same hopping frequency can either be slots sharing a joint indicator of frequency, or slots that use a same frequency even though they possibly have separate indicator of their respective frequencies.

Figure 5:
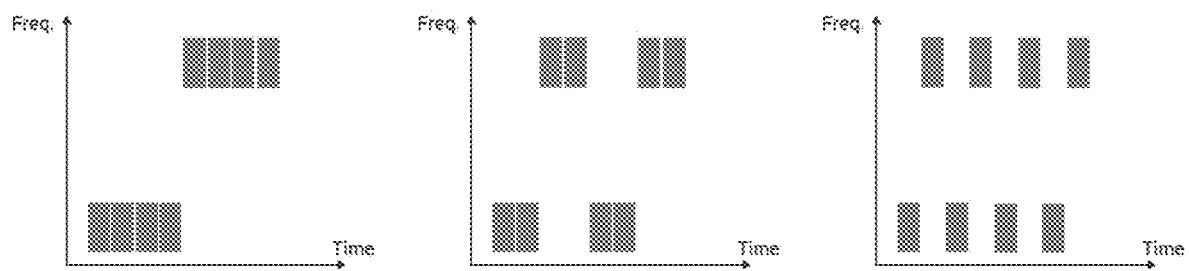
FIG. 5 illustrates examples of frequency hopping patterns.

In one embodiment, a frequency hopping pattern can be determined for the UE. In an example, the frequency hopping pattern for different UEs can be indicated to respective UEs specifically by gNB, e.g. via RRC or L1 signaling in a download control information (DCI). With this embodiment, interference can be randomized, and the PUCCH transmission can be more robust to interference. FIG. 5 illustrates an example of frequency hopping patterns for the case of 8 PUCCH repetitions and 2 different hopping frequencies. In this example, positions of the coherent slots can be determined based on a frequency hopping pattern, since for different frequency hopping patterns, positions of slots using a same hopping frequency are arranged differently.

In some embodiments, the UE can report its capability and/or capability level of supporting channel estimation (at the receiver) across slots to a gNB with respect to one or more of the factors, such as uplink transmission power and other factors mentioned above. Based on these factors, the gNB is able to determine the UE's capability and/or capability level, as discussed above. In some other embodiments, the UE needs not to report its capability and/or capability level of supporting channel estimation (at the receiver) across slots. The UE can promise that it is capable of keeping coherence in transmission in at least the first time instant and the second time instant. For example, it can be specified in an industry/communication standard that, a UE should promise a single complex number (phase shift) across allocated bandwidth between slots, where a same PRB are used for the UE across slots.

In order to support an effective cross-slot channel estimation, DMRS configuration of PUCCH repetition in multiple slots can be adjusted when cross-slot channel estimation is applied, according embodiments of the present disclosure. In NR Release 15 and Release 16, one DMRS configuration is applied for all PUCCH repetitions of the UCI from one UE. Cross-slot channel estimation implies that DMRS in one slot/repetition can aid channel estimation in adjacent slots/repetitions. If a gNB predicts that a radio channel is static and suitable for cross-slot channel estimation for a UE, it can let the UE reduce or omit DMRS resources allocated for some or all PUCCH repetitions. Zero DMRS in a PUCCH in a slot is also regarded as a DMRS configuration in the present disclosure.

PUCCH repetitions with less or no DMRS can include PUCCH repetitions specified in NR Release 15, or other kinds of PUCCH repetitions. In such cases, DMRS configuration can be configured for each PUCCH repetition, separately. Hereafter, DMRS configuration of a PUCCH repetition can include a number of DMRS symbols and locations of DMRS symbols, or frequency density of DMRS resource element and locations of DMRS resource elements in a resource block.

Figure 6:
FIG. 6 illustrates exemplary DMRS configurations for multiple transmissions of an uplink signal on physical control channel according to some embodiments of the present disclosure.

In some embodiments, a UE can determine a first demodulation reference signal configuration for the first transmission of the uplink signal on physical control channel in the first time instant, and a second demodulation reference signal configuration for the transmission of the second uplink signal on physical control channel in the second time instant. Multiple DMRS configurations can be configured for PUCCH repetitions of a same UCI. The UE can be configured with a DMRS pattern across slots/repetitions by gNB, through RRC signaling or uplink DCI, for example. FIG. 6 illustrates an exemplary DMRS pattern across 4 repetitions, in which one repetition is transmitted in one slot. In this example, the DMRS pattern can be "1 0 1 0". It means the first slot (slot n) and the third slot (slot n+2) will use a default DMRS configuration, and the other two slots will not use any DMRS.

When multiple DMRS configurations are configured for PUCCH repetitions of a same UCI, it implies that in some of these PUCCH repetitions, at least part of DMRS are omitted. Then, at least part of resources or symbols reserved for the omitted DMRS can be utilized for transmitting more other information. UE can perform transmission in one or more of below ways. In this disclosure, a length of PUCCH repetition is a number of continuous symbols for UCI and DMRS, if any.

In some embodiments, the UE can keep a same length of PUCCH repetition for different DMRS configurations, with utilizing symbols reserved for omitted DMRS to transmit UCI bits or dummy bits. In one option, different numbers of UCI bits are configured for different DMRS configurations, whereby a size of UCI included in a PUCCH repetition can be determined based on resources available for UCI, including the symbols reserved for omitted DMRS in the PUCCH repetition.

Figure 7:
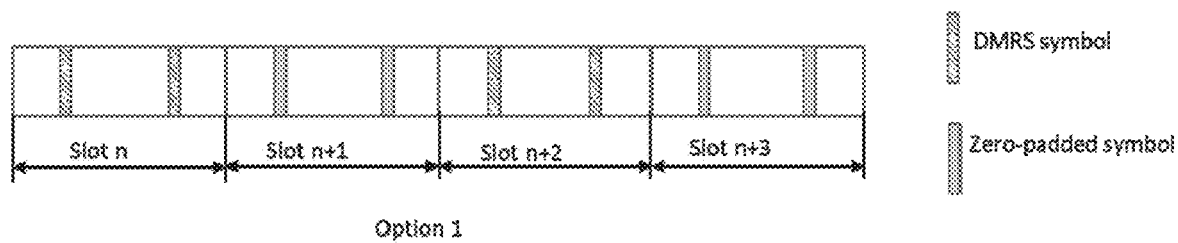
FIG. 7 illustrates an exemplary configuration of UCI and DMRS in multiple transmissions of an uplink signal on physical control channel according to some embodiments of the present disclosure.

In another option, a same number of UCI bits and separate zero/dummy bits padding or puncture are configured for different DMRS configurations. FIG. 7 illustrates an example of the latter option. In this example, the UE is scheduled with PUCCH repetitions in 4 slots, with S=0, L=14, K=4 (S is denoted as an index of a starting symbol in a slot; L is denoted as the length of a PUCCH repetition, and K is denoted as a number of PUCCH repetitions). As shown in FIG. 7, uplink DMRS symbols are configured in the first slot (slot n) and the third slot (slot n+2), and no uplink DMRS configured in other slots. The UE can transmit PUCCH repetitions in slot n and slot n+2 normally, for example as defined in NR Release 15. In slot n+1 and slot n+3, the UE transmits UCI in 12 symbols as in slot n and adds zero/dummy bits in the omitted DMRS symbols, so that the PUCCH repetitions in the slots n+1 and n+3 are extend to 14 symbols. In another example, the UE can transmit UCI in 14 symbols in slot n+1 and slot n+3, with utilizing the 2 symbols reserved for the omitted DMRS. In in slot n and slot n+2, the UE can transmit UCI of a same size as that in slot n+1 and slot n+3, with puncturing.

Figure 8A:
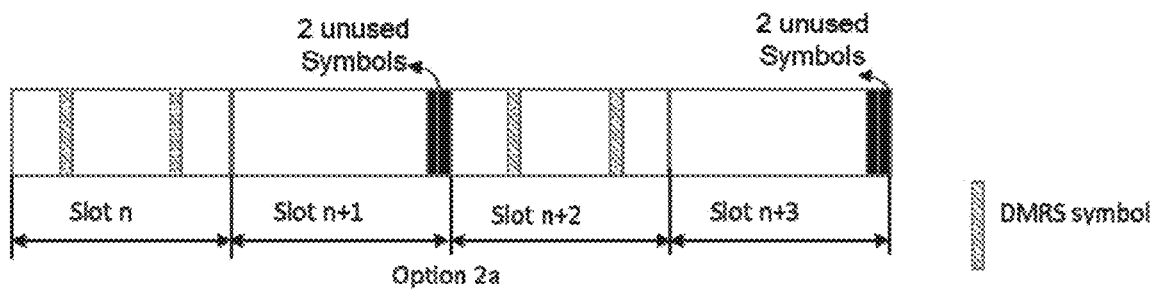
FIGS. 8A and 8B illustrate exemplary configurations of UCI and DMRS in multiple transmissions of an uplink signal on physical control channel according to some embodiments of the present disclosure.

In some embodiments, the UE can keep different lengths of PUCCH repetitions for different DMRS configurations, with a same UCI size for all DMRS configurations. In this case, the UE can determine one UCI size for all repetitions once. Each of the PUCCH repetition are transmitted in continuous symbols, so as to leave the reserved symbols for omitted DMRS together for facilitating a utilization of these reserved symbols. In one option, each repetition can start from a first scheduled symbol in a slot. For example, this option can be applied for slot-based PUCCH repetitions, where the PUCCH repetitions is scheduled per slot. Take a same configuration as S=0, L=14, K=4, and the numbers of UL DMRS symbols in the respective repetitions are configured to be 2 0 2 0. FIG. 8A illustrates an example of this Option. As shown in FIG. 8A, in slot n+1 and n+3, UE can leave the reserved symbols for omitted DMRS together at the end of a slot, and there is only one repetition in one slot.

Figure 8B:
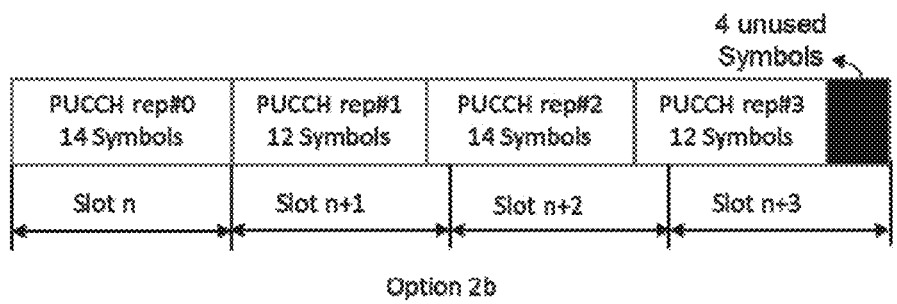

In another option, each PUCCH repetition can start immediately after the previous PUCCH repetition. For example, this option can be applied for PUCCH repetitions, each of which is not required to use the same symbols in one slot. Take a same configuration as S=0, L=14, K=4, and the numbers of UL DMRS symbols in the respective repetitions are configured to be 2 0 2 0. FIG. 8B illustrates an example of this Option. As shown in FIG. 8B, the PUCCH repetitions

1 and #3 have 12 OFDM symbols without any DMRS symbols, and there is no gap between PUCCH repetitions. Thus, the UE can leave the reserved symbols for omitted DMRS together at the end of the four PUCCH repetitions.

In some embodiments, the UE can keep different lengths of PUCCH repetitions for different DMRS configurations, and the UE determines different UCI sizes for respective DMRS configurations. The UE can determine UCI size in a PUCCH repetition according to a number of available uplink symbols in a slot and a number of configured DMRS symbols for the repetition. For example, if some of the slots are flexible slots with different number of uplink symbols, the number of symbols for UCI in each of the slot equal to (a number of available UL symbols in the slot—number of configured DMRS symbols).

In an example, the numbers of UL DMRS symbols in four repetitions are configured to be 2, 0, 2, 0, respectively. The starting slot has only 12 uplink symbols available and others have 14 uplink symbols per slot. So, UCI in the four repetitions uses 10, 14, 12, 14 uplink symbols, respectively.

Embodiments of the present disclosure can further provide enhancements of PUCCH repetitions. In NR Rel-15, a PUCCH signal can be repeated over $N_{PUCCH}^{repeat}$ slots, slots, $N_{PUCCH}^{repeat}$ may be 2 or 4 or 8. Each repetition uses a same index of uplink symbols in $N_{PUCCH}^{repeat}$ slots. In a TDD configuration of DDDSU, if a PUCCH repetition starts from the last several symbols in a special slot, then the next PUCCH repetition uses the same symbols in the subsequent uplink slot. However, the first several symbols in uplink slot is not used, and the two repetitions are not continuous. When cross-slot channel estimation is used for PUCCH repetition, it would be easier to keep phase continuity across PUCCH repetitions in multiple slots, if PUCCH repetitions can be transmitted continuously without gap in between.

In the present disclosure, a span is defined as a group of continuous uplink OFDM symbols. For example, a span can include some, not necessarily all, continuous uplink symbols in any one of below cases:
  a flexible slot, the flexible slot is a slot comprising both uplink symbols and downlink symbols;
  a flexible slot and subsequent one or more uplink slots;
  one or more uplink slots.

Figure 9:
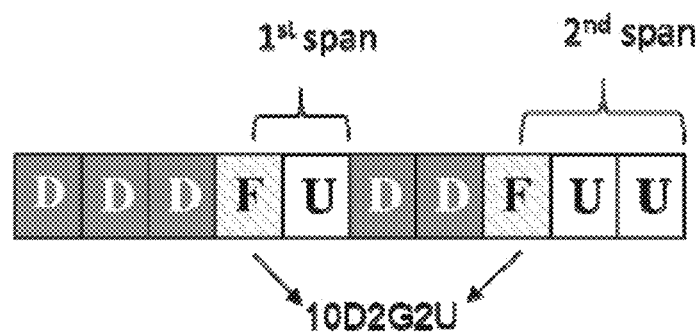
FIG. 9 illustrates an exemplary configuration of a span according to some embodiments of the present disclosure.

For example, as shown in FIG. 9, there are two spans in the ten slots. The flexible slot is configured to be in a structure of 10D2G2U. The first span consists of two uplink OFDM symbols in a first flexible slot and the following uplink slot; the second span is composed of two uplink symbols in a second flexible slot and two uplink slots.

In some embodiments, multiple PUCCH repetitions can be transmitted within a span. As such, PUCCH repetition can fully utilize uplink symbols in flexible slots and uplink slots so as to improve spectrum efficiency. In an example, a PUCCH repetition can be split into multiple segments, if it crosses slot border inside a span.

In some embodiments, it can be determined whether one PUCCH repetition is allowed to cross multiple spans or not. This can be configured by a gNB, e.g. through an RRC/L1 signaling. If one PUCCH repetition is not allowed to cross spans, a number of PUCCH repetitions in a span can be configured based on at least one of a number of available uplink symbols of a span and a length of one PUCCH repetition. In the present disclosure, K is denoted as a number of PUCCH repetitions, and nrofSymbols is denoted as a length of one PUCCH repetition. The nrofSymbols can be a RRC configured parameter. In an example, the number of PUCCH repetitions in a span is computed as:

floor(number of available UL symbols of a span/nrofSymbols).

A UE can use continuous uplink symbols starting from the first available uplink symbol in a span. If one span doesn't have enough available uplink symbols for K PUCCH repetitions, the UE would not use this span. The UE can determine to use uplink symbols in a next span.

If one PUCCH repetition is allowed to cross spans, a number (denoted as S) of spans needed for K PUCCH repetitions can be determined based on at least one of available uplink symbols in the span and the length of one PUCCH repetition. In an example, S is the minimum integral number so that a number of available uplink symbols in S spans are equal to or above K*nrofSymbols. Minimum symbols (denoted as X) for a PUCCH transmission in a span can be determined based on at least one of a number of available uplink symbols of a span and the length of one PUCCH repetition. In an example, if Mod(number of available uplink symbols of a span, nrofSymbols) is less than X, the X symbols in the span are not used for PUCCH transmission.

In some embodiments, the multiple PUCCH repetitions can be transmitted continuously within one or more spans. Alternatively, some uplink symbols may be configured as unavailable and not used for PUCCH transmission. The unavailable symbols can be RRC/L1 configured or fixed in a specification of an industry/communication standard. In an example, some UEs may need the first uplink symbol in a span for automatic gain control (AGC). In another example, the last n symbols in a span are not used.

If one PUCCH repetition spans across a slot border and generates several segments, a UE can be configured that DMRS placement is based on the PUCCH repetition or on each segment. In a case where DMRS placement is based on the PUCCH repetition, the DMRS placement of the segmented PUCCH repetition is the same as a non-segmented repetition, which may be dependent on a length of the PUCCH repetition. In a case where DMRS placement is based on each segment, the DMRS placement of the segmented PUCCH repetition can be determined based on lengths of respective segments. DMRS placement based on length of segment can guarantee that there is DMRS in every segment and that the DMRS in every segment is suitable for cross-slot channel estimation.

A length of a PUCCH format 3 and format 4 is from 4 to 14 OFDM symbols. DMRS placement for each length of the two PUCCH formats has been specified in NR Release 15. But segmentation across slot border may result in a segment with a length from 2, 3, 4 . . . to 13 symbols. In an example, a segment-based DMRS placement for a segment with a length of 4 to 13 symbols can reuse a scheme of DMRS placement defined for a PUCCH repetition of the same length. For a segment with length of 2 or 3 symbols, a scheme of a segment-based DMRS placement can be defined additionally. In an example, a segment-based DMRS placement in this case can be defined according to at least one of the following factors: a length of the segment, whether there is an additional DMRS or not, and whether frequency hopping is enabled or not. Table 3 is an example.

TABLE 3

DMRS positions for a segment of PUCCH format 3 and 4 repetition

| length of a PUCCH segment | DMRS position/within a PUCCH segment | | | |
|---|---|---|---|---|
| | No additional DMRS | | Additional DMRS | |
| | No hopping | Hopping | No hopping | Hopping |
| 2 | 0 | — | — | — |
| 3 | 1 | — | 0, 2 | — |

Figure 10:
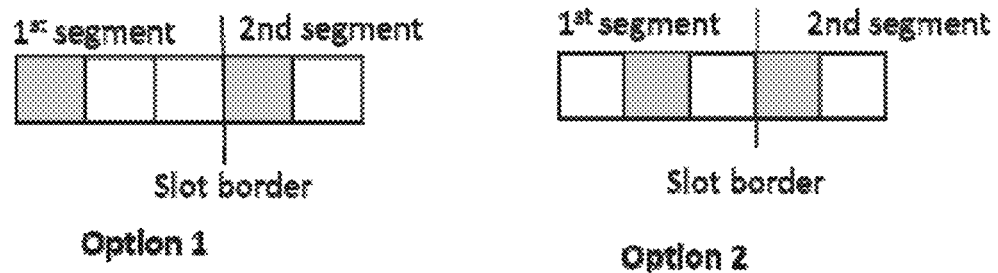
FIG. 10 illustrates an exemplary segment-based DMRS placement, according to some embodiments of the present disclosure.

FIG. 10 illustrates an exemplary segment-based DMRS placement, which takes an example of PUCCH format 3 or 4 with length of 5. One PUCCH repetition can be split into two segments around a slot border. As shown in FIG. 10, The grey and white blocks show DMRS and UCI, respectively. When Option 1, DMRS placement is the same as that for a PUCCH repetition with a length of 5 symbols without segment. With Option 2, a DMRS position in each segment is based on indications in a column of "no additional DMRS" and "no hopping" in above table 3.

In order to enhance PUCCH repetition, a supported number of PUCCH repetitions can be increased. A straightforward solution to improve PUCCH coverage is time-domain repetition. The supported number of repetitions in NR Release 15 may be 2, 4 or 8, and it is configured by a RRC parameter nrofSlots. In some embodiments, a maximum number of PUCCH repetitions can be further increased to a larger number, such as 16. Additionally, intermediate numbers of PUCCH repetitions can also be supported.

The UE can receive from a gNB an indication of the number of PUCCH repetitions. The number of PUCCH repetitions can be configured with one or more of RRC signaling and DCI signaling. In an example, an information element nrofSlots can be extent with new values. Alternatively, a new information element which contains new candidate numbers of PUCCH repetitions can be defined.

In NR 4-step RACH (Random Access Channel) or 2-step RACH up to Release 16, after a UE receives a PDSCH (Physical Downlink Shared CHannel) signal with UE contention resolution identity, it transmits HARQ-ACK information in a PUCCH, without repetition. However, in some embodiments of the present disclosure, PUCCH repetitions can be applied for hybrid automatic repeat request feedback (HARQ-ACK) of Msg4 or MsgB. A UE can be configured with multiple PUCCH repetitions for Msg4 or MsgB HARQ-ACK feedback, for example through at least one of the following parameters: a number of PUCCH repetitions, resources for PUCCH repetition, a type of PUCCH repetitions (e.g. slot-based or not), and frequency hopping-related parameters. PUCCH repetition of Msg4 HARQ-ACK feedback and increased number of PUCCH repetition can exploit time-domain diversity for such channels.

PUCCH repetition can be configured and/or activated in one or more of the following ways to indicate the PUCCH repetition of Msg4 or MsgB in 4-step RACH or 2-step RACH, respectively:

configured and activated with system information block (SIB) 1;
configured with SIB1 and activated with dedicated signaling;
configured and activated with dedicated signaling.

Dedicated signaling can be send in one or more of the following: a PDSCH for Msg4 or MsgB; a DCI scheduling Msg4 or MsgB; a dedicated RRC signaling when UE is in connected mode. An example of PDSCH for Msg4 or MsgB is MAC (Media Access Control) PDU (Protocol Data Unit) including UE Contention Resolution Identity MAC CE (Control Element).

In TDD, one radio frame may have a flexible slot followed by one or more uplink slots, e.g. DDDSU, DDSUU. A flexible slot has less uplink symbols than an uplink slot. Thus, it is possible that different UCI data or even PUCCH formats are transmitted in a flexible slot and an uplink slot. In embodiments of the present disclosure, a UE can split its UCI bits into two PUCCH signals to be transmitted in a flexible slot and the subsequent one or more uplink slots, respectively.

Figure 11:
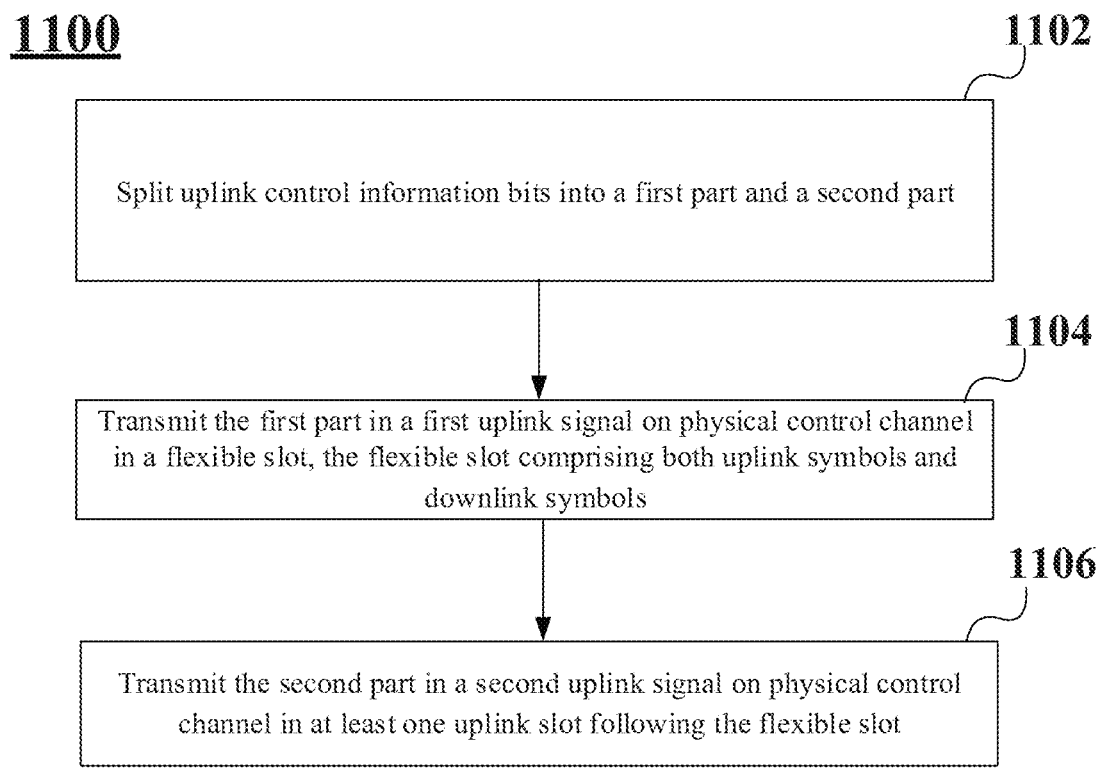
FIG. 11 illustrates a flowchart of a method for transmitting an uplink signal on physical control channel according to some embodiments of the present disclosure.

FIG. 11 illustrates a flowchart of a transmission method 1100 in this way. As shown in FIG. 11, the method 1100 may comprise: splitting uplink control information bits into a first part and a second part at block 1102; transmitting the first part in a first uplink signal on physical control channel in a flexible slot, the flexible slot comprising both uplink symbols and downlink symbols at block 1104; and transmitting the second part in a second uplink signal on physical control channel in at least one uplink slot following the flexible slot at block 1106.

Figures 12, 13:
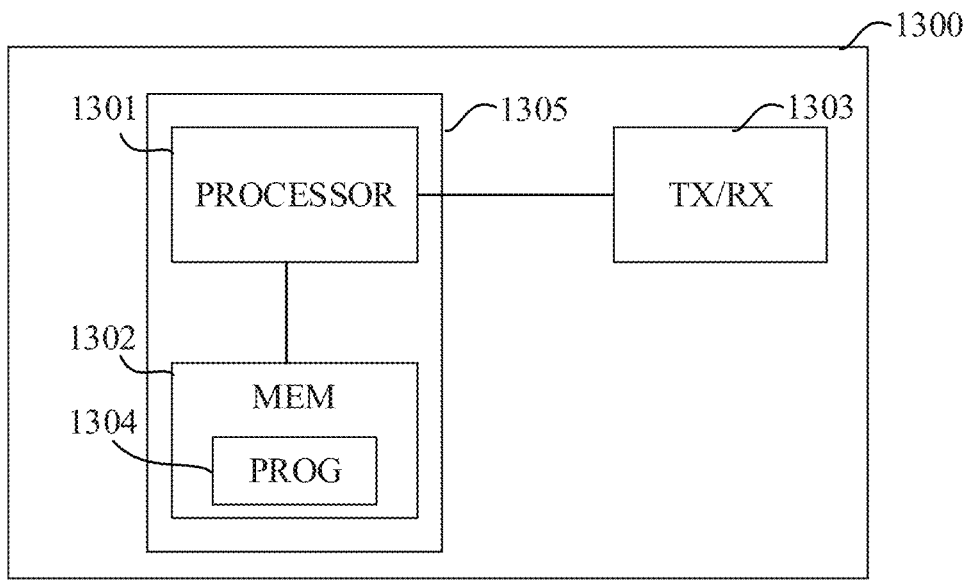
FIG. 12 illustrates a flowchart of a method for receiving an uplink signal on physical control channel according to some embodiments of the present disclosure.
FIG. 13 is a block diagram illustrating an apparatus according to some embodiments of the present disclosure.

FIG. 12 illustrates a flowchart of a method for receiving in this way. As shown in FIG. 12, the method 1200 may comprise: receiving a first part of uplink control information bits in a first uplink signal on physical control channel in a flexible slot, the flexible slot comprising both uplink symbols and downlink symbols at block 1202; and receiving a second part of the uplink control information bits in a second uplink signal on physical control channel in at least one uplink slot following the flexible slot at block 1204.

The two PUCCH signals can have a same PUCCH format or different PUCCH formats. In some embodiments, the UCI can be split into two PUCCH signals based on UCI type. In an example, the UE can transmit SR and ACK for a first PUCCH signal in the flexible slot, and transmit CSI for the second PUCCH signal in the one or more uplink slots. In another example, the UE can transmit SR, ACK and a first part of CSI for the first PUCCH signal in the flexible slot, and transmit a second part of CSI for a second PUCCH signal in the one or more uplink slots.

In some embodiments, the UCI can be split into two PUCCH signals based on a number of uplink symbols in the flexible slot. In an example, after choosing a PUCCH format, the UE can map its UCI bits to the first PUCCH signal, which is transmitted in the flexible slot, and map the remaining UCI bits to the second PUCCH signal, which is transmitted in one or more uplink slot.

In some embodiments, if PUCCH repetition is configured, a PUCCH signal in a flexible slot can be repeated in subsequent flexible slots; and a PUCCH signal in uplink slot can be repeated in subsequent uplink slots. For example, in a radio frame of "DDFUUDDFUU", a first PUCCH signal is repeated in "F" slots, the second PUCCH signal is repeated in "U" slots.

In some embodiments, the first PUCCH signal and the second PUCCH signal can be transmitted according to a PUCCH format which is defined by utilizing some or all uplink symbols in the flexible slot and subsequent symbols in one or more uplink slots. In this way, the length of PUCCH in this format can be larger than 14 symbols.

FIG. 13 illustrates a simplified block diagram of an apparatus 1300 that may be embodied in/as a terminal device (e.g., a UE), or a network node (e.g., a gNB). The apparatus 1300 may comprise at least one processor 1301, such as a data processor (DP) and at least one memory (MEM) 1302 coupled to the processor 1301. The apparatus 1300 may further comprise a transmitter TX and receiver RX 1303 coupled to the processor 1301. The MEM 1302 stores a program (PROG) 1304. The PROG 1304 may include instructions that, when executed on the associated processor 1301, enable the apparatus 1300 to operate in accordance with the embodiments of the present disclosure, for example to perform one of the methods 300, 400, 1100, 1200. A combination of the at least one processor 1301 and the at least one MEM 1302 may form processing means 1305 adapted to implement various embodiments of the present disclosure.

Various embodiments of the present disclosure may be implemented by computer program executable by one or more of the processors 1301, software, firmware, hardware or in a combination thereof.

The MEMs 1302 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1301 may be of any type suitable to the local technical environment, and may include one or more of general purpose computers, special purpose computers, microprocessors, digital signal processors DSPs and processors based on multicore processor architecture, as non-limiting examples.

Reference is now made to FIGS. 14A and 14B, which illustrates a schematic block diagram of apparatus 1400A and 1400B in a terminal device, such as a UE. The apparatus 1400A and 1400B are operable to carry out the exemplary methods 300 and or method 1100 described with reference to FIGS. 3 and 11, respectively, and possibly any other processes or methods.

As shown in FIG. 14A, the apparatus 1400A may comprise: a determining unit 1401 configured to determine that a terminal device has a capability of transmitting the uplink signal on physical control channel in at least a first time instant and a second time instant coherently; and a transmitting unit 1402 configured to perform a first transmission of the uplink signal on physical control channel in the first time instant in a first set of subcarriers, and perform a second transmission of the uplink signal on physical control channel in the second time instant in a second set of subcarriers.

In some embodiments, the apparatus 1400A may further comprise a receiving unit 1403 configured to receive from a network node an indication indicating in which time instant and/or for how many time instants the terminal device has the capability of transmitting the uplink signal on physical control channel coherently. The receiving unit 1403 may be further configured to receive from a network node an indication indicating between which hops of a frequency hopping pattern the terminal device has the capability of transmitting the uplink signal on physical control channel coherently.

As shown in FIG. 14B, the apparatus 1400B may comprise: a splitting unit 1404 configured to split uplink control information bits into a first part and a second part. The apparatus 1400B may further comprise a transmitting unit 1405 configured to transmit the first part in a first uplink signal on physical control channel in a flexible slot, the flexible slot comprising both uplink symbols and downlink symbols and transmit the second part in a second uplink signal on physical control channel in at least one uplink slot following the flexible slot.

In embodiments, the units of the apparatus 1400A and 1400B may be configured to implement the operations of corresponding blocks of the methods 300 and 1100 respectively, and therefore relevant descriptions provided with reference to methods 300 and 1100 also apply here and thus details will not be repeated.

Reference is now made to FIGS. 15A and 15B, which illustrates a schematic block diagram of apparatus 1500A and 1500B in a network node in a wireless communication network, such as a gNB. The apparatus 1500A and 1500B is operable to carry out the exemplary method 400 and method 1200 described with reference to FIGS. 4 and 12, respectively, and possibly any other processes or methods.

As illustrated in FIG. 15A, the apparatus 1500A may comprises a determining unit 1501 configured to determine that a terminal device has a capability of transmitting the uplink signal on physical control channel in at least a first time instant and a second time instant coherently, and a receiving unit 1502 configured to receive from the terminal device, a first transmission of the uplink signal on physical control channel in the first time instant in a first set of subcarriers, and receive from the terminal device, a second transmission of the uplink signal on physical control channel in the second time instant in a second set of subcarriers.

In some embodiments, the apparatus 1500A may further comprise a channel estimation unit 1503 configured to perform channel estimation by coherently combining the first transmission of the uplink signal on physical control channel and the second transmission of the uplink signal on physical control channel. The apparatus 1500A may further comprise a transmitting unit 1504 configured to transmit to a terminal device an indication indicating in which time instant and/or for how many time instants the terminal device has the capability of transmitting the uplink signal on physical control channel coherently. The transmitting unit 1504 may be further configured to transmit to the terminal device an indication indicating between which hops of a frequency hopping pattern the terminal device has the capability of transmitting the uplink signal on physical control channel coherently.

In some embodiments, the apparatus 1500A may further comprise a transmitting unit 1504 configured to transmitting to the terminal device, the indication indicating in which time instant and/or for how many time instants the terminal device has the capability of transmitting the uplink signal on physical control channel coherently.

As illustrated in FIG. 15B, the apparatus 1500B may comprises a receiving unit 1505 configured to receive a first part of uplink control information bits in a first uplink signal on physical control channel in a flexible slot, the flexible slot comprising both uplink symbols and downlink symbols; and receive a second part of the uplink control information bits in a second uplink signal on physical control channel in at least one uplink slot followed the flexible slot.

In some embodiments, the units of the apparatus 1500A and 1500B may be configured to implement the operations of corresponding blocks of the method 400, 1200, respectively, and therefore relevant descriptions provided with reference to the methods 400 and 1200 also apply here and thus details will not be repeated.

Figure 16:
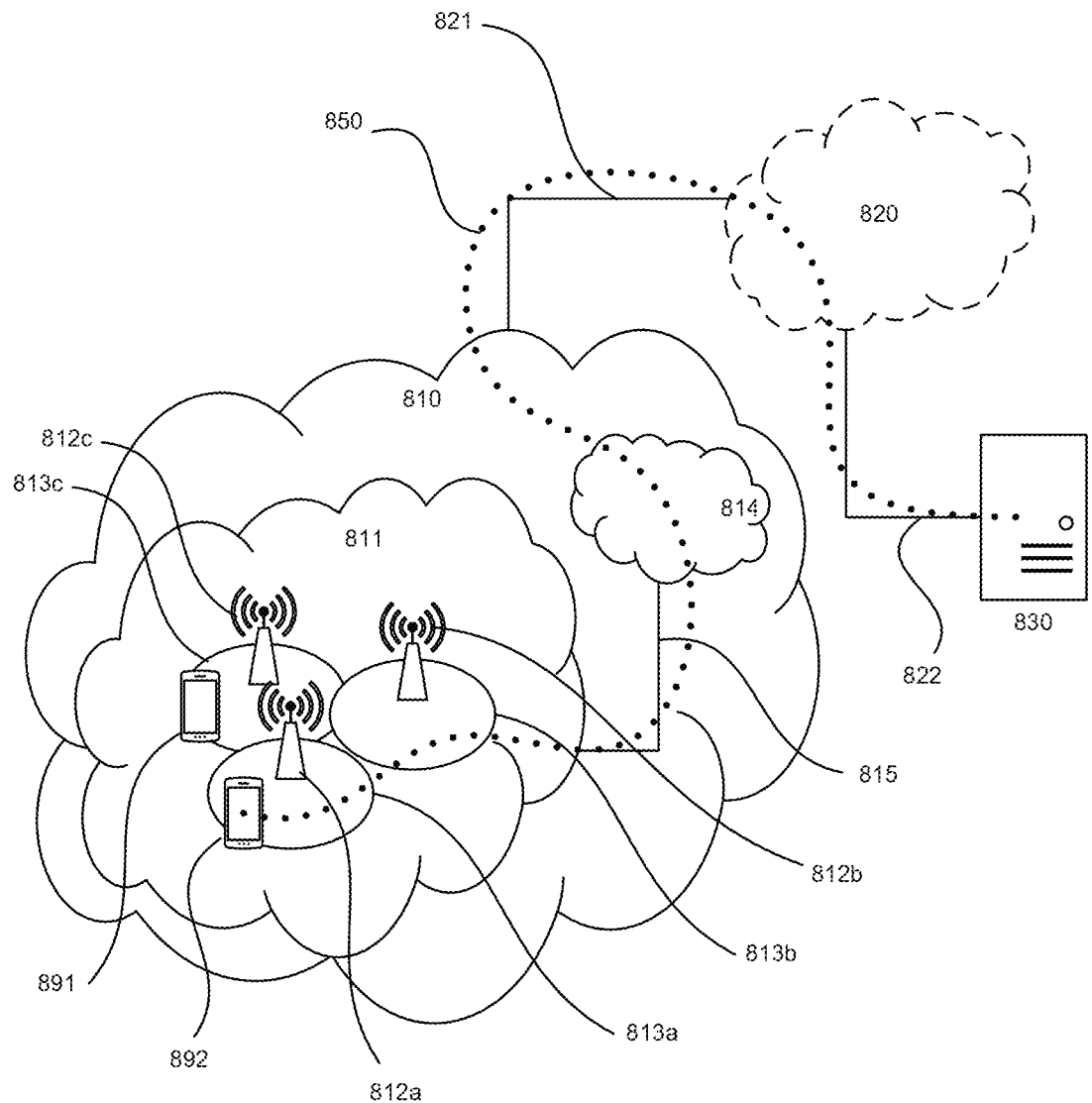
FIG. 16 is a block diagram illustrating a telecommunication network connected via an intermediate network to a host computer in accordance with some embodiments of the present disclosure.

FIG. 16 is a block diagram illustrating a telecommunication network connected via an intermediate network to a host computer in accordance with some embodiments of the present disclosure.

With reference to FIG. 16, in accordance with an embodiment, a communication system includes a telecommunication network 810, such as a 3GPP-type cellular network, which comprises an access network 811, such as a radio access network, and a core network 814. The access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to the core network 814 over a wired or wireless connection 815. A first UE 891 located in a coverage area 813c is configured to wirelessly connect to, or be paged by, the corresponding base station 812c. A second UE 892 in a coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. Connections 821 and 822 between the telecommunication network 810 and the host computer 830 may extend directly from the core network 814 to the host computer 830 or may go via an optional intermediate network 820. An intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 16 as a whole enables connectivity between the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, the base station 812 may not or need not be informed about the past routing of an incoming downlink communication with data originating from the host computer 830 to be forwarded (e.g., handed over) to a connected UE 891. Similarly, the base station 812 need not be aware of the future routing of an outgoing uplink communication originating from the UE 891 towards the host computer 830.

Figure 17:
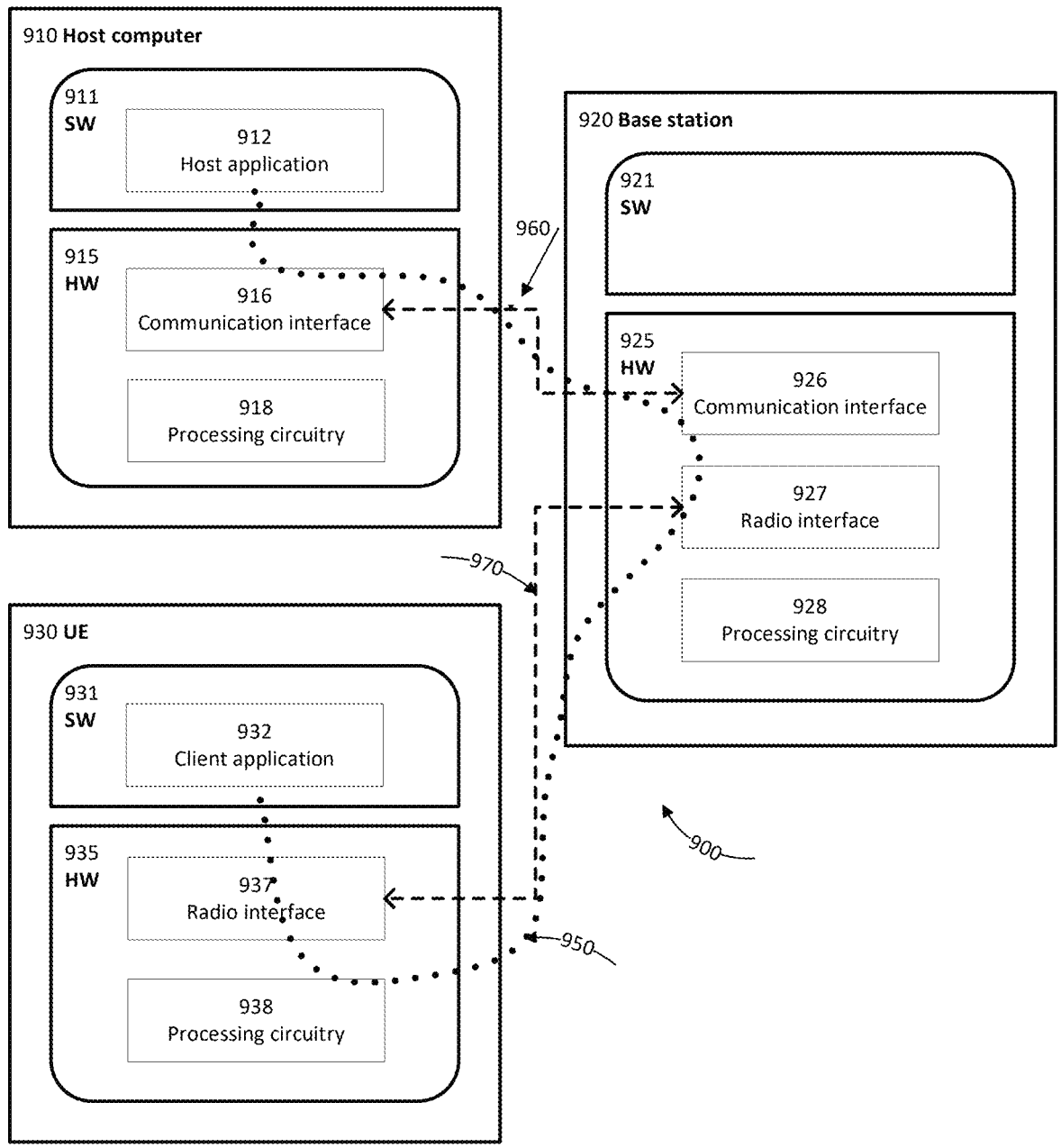
FIG. 17 is a block diagram illustrating a host computer communicating via a base station with a UE over a partially wireless connection in accordance with some embodiments of the present disclosure.

FIG. 17 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 17. In a communication system 900, a host computer 910 comprises hardware 915 including a communication interface 916 configured to set up and maintain a wired or wireless connection with an interface of a different communication device of the communication system 900. The host computer 910 further comprises a processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with the UE 930 located in a coverage area (not shown in FIG. 17) served by the base station 920. The communication interface 926 may be configured to facilitate a connection 960 to the host computer 910. The connection 960 may be direct or it may pass through a core network (not shown in FIG. 17) of the telecommunication system and/or through one or more intermediate networks outside the telecommunication system. In the embodiment shown, the hardware 925 of the base station 920 further includes a processing circuitry 928, which may comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes a processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

It is noted that the host computer 910, the base station 920 and the UE 930 illustrated in FIG. 17 may be similar or identical to the host computer 830, one of base stations 812a, 812b, 812c and one of UEs 891, 892 of FIG. 16, respectively. This is to say, the inner workings of these entities may be as shown in FIG. 17 and independently, the surrounding network topology may be that of FIG. 16.

In FIG. 17, the OTT connection 950 has been drawn abstractly to illustrate the communication between the host computer 910 and the UE 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

Wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 950 between the host computer 910 and the UE 930, in response to variations in the measurement results. The measurement procedure and/or the network functionality for reconfiguring the OTT connection 950 may be implemented in software 911 and hardware 915 of the host computer 910 or in software 931 and hardware 935 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which the software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer 910's measurements of throughput, propagation times, latency and the like. The measurements may be implemented in that the software 911 and 931 causes messages to be transmitted, in particular empty or 'dummy' messages, using the OTT connection 950 while it monitors propagation times, errors etc.

Figure 18:
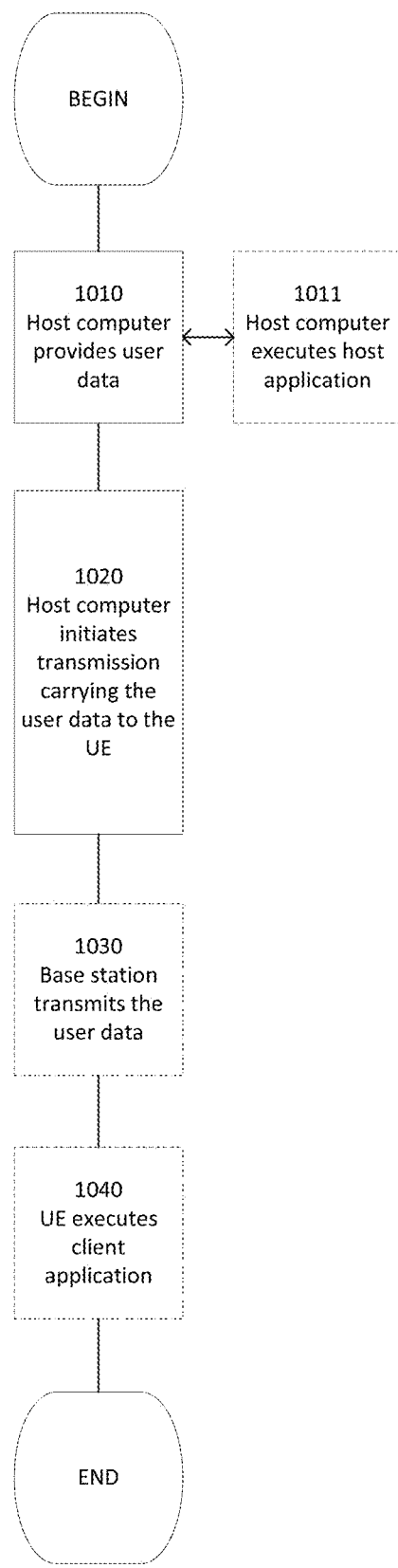
FIG. 18 is a flowchart illustrating a method implemented in a communication system, in accordance with an embodiment of the present disclosure.

FIG. 18 is a flowchart illustrating a method implemented in a communication system, in accordance with an embodiment. The communication system includes a host computer, a base station and a UE which may be those described with reference to FIG. 16 and FIG. 17. For simplicity of the present disclosure, only drawing references to FIG. 18 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 19:
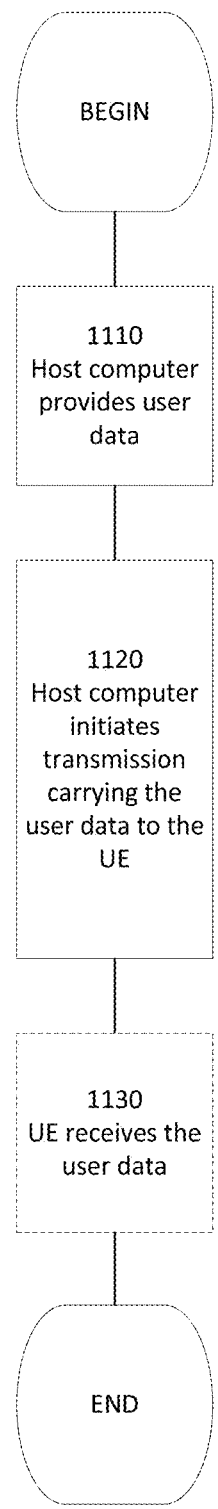
FIG. 19 is a flowchart illustrating a method implemented in a communication system, in accordance with an embodiment of the present disclosure.

FIG. 19 is a flowchart illustrating a method implemented in a communication system, in accordance with an embodiment. The communication system includes a host computer, a base station and a UE which may be those described with reference to FIG. 16 and FIG. 17. For simplicity of the present disclosure, only drawing references to FIG. 19 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 20:
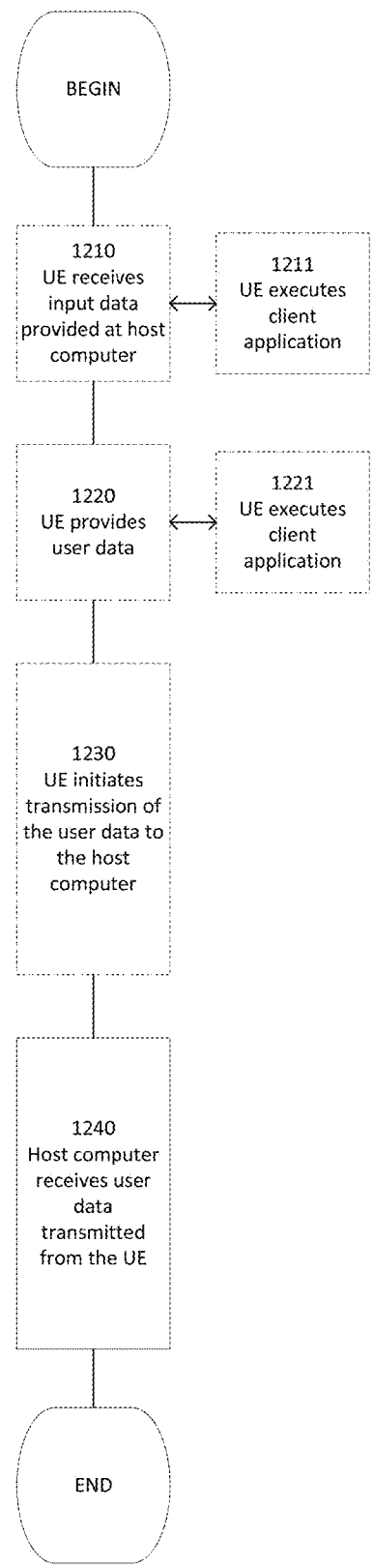
FIG. 20 is a flowchart illustrating a method implemented in a communication system, in accordance with an embodiment of the present disclosure.

FIG. 20 is a flowchart illustrating a method implemented in a communication system, in accordance with an embodiment. The communication system includes a host computer, a base station and a UE which may be those described with reference to FIG. 16 and FIG. 17. For simplicity of the present disclosure, only drawing references to FIG. 20 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 21:
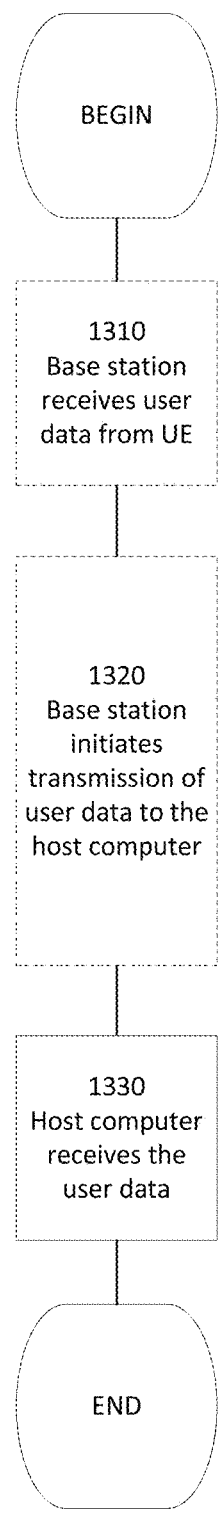
FIG. 21 is a flowchart illustrating a method implemented in a communication system, in accordance with an embodiment of the present disclosure.

FIG. 21 is a flowchart illustrating a method implemented in a communication system, in accordance with an embodiment. The communication system includes a host computer, a base station and a UE which may be those described with reference to FIG. 16 and FIG. 17. For simplicity of the present disclosure, only drawing references to FIG. 21 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method for transmitting an uplink signal on physical control channel, the method comprising:
   determining that a terminal device has a capability of transmitting the uplink signal on physical control channel in at least a first time instant and a second time instant coherently;
   performing a first transmission of the uplink signal on physical control channel in the first time instant; and
   performing a second transmission of the uplink signal on physical control channel in the second time instant.

2. The method according to claim 1, wherein the second transmission of the uplink signal on physical control channel is a repetition of the first transmission of the uplink signal on physical control channel.

3. The method according to claim 1, further comprising:
   indicating to a network node that the terminal device has the capability of transmitting the uplink signal on physical control channel in at least the first time instant and the second time instant coherently.

4. The method according to claim 1, wherein each of the first time instant and the second time instant comprises:
   one or more slots; and/or
   one or more sub-slots; and/or
   one or more multiple-slots.

5. The method according to claim 1, wherein the second time instant immediately follows the first time instant.

6. The method of claim 1, wherein the method further comprises:
   performing the first transmission of the uplink signal on physical control channel in the first time instant; and
   performing the second transmission of the uplink signal on physical control channel in the second time instant, wherein the first set of subcarriers and the second set of subcarriers are same.

7. The method according to claim 6, wherein the capability of transmitting the uplink signal on physical control channel in at least the first time instant and the second time instant coherently is determined based on at least one of the following:
   whether the first time instant and the second time instant are consecutive;
   a change in transmission power between the first time instant and the second time instant;
   a frequency offset between a central frequency of the first set of subcarriers and a central frequency of the second set of subcarriers; and
   an uplink spatial relation between uplink control channel transmissions in the first time instant and the second time instant.

8. The method according to claim 1, further comprising:
   indicating to a network node of a number of time instants in which the terminal device has the capability of transmitting the uplink signal on physical control channel coherently.

9. The method according to claim 1, further comprising:
   receiving from a network node an indication indicating in which time instant and/or for how many time instants the terminal device has the capability of transmitting the uplink signal on physical control channel coherently.

10. The method according to claim 1, further comprising:
    receiving from a network node an indication indicating between which hops of a frequency hopping pattern the terminal device has the capability of transmitting the uplink signal on physical control channel coherently.

11. The method according to claim 1, wherein the capability of transmitting the uplink signal on physical control channel in at least the first time instant and the second time instant coherently has one or more capability levels, and a number of time instants in which the terminal device has the capability is defined for each capability level.

12. The method according to claim 11, wherein the number of time instants is defined for each capability level according to one or more of the following parameters:
    a numerology of an uplink control channel;
    a demodulation reference signal configuration of the uplink signal on physical control channel;
    a number of repetitions of the uplink signal on physical control channel;
    a format of the uplink signal on physical control channel;
    a number of orthogonal frequency division multiplexing, OFDM, symbols of the uplink signal on physical control channel in one slot;

whether a resource allocated to the uplink signal on physical control channel is a dedicated or common resource; and a type of frequency hopping.

13. The method according to claim 1, wherein a same hopping frequency is used in the first time instant and the second time instant when a frequency hopping is enabled.

14. The method according to claim 1, wherein the terminal device is capable of keeping coherence in transmission in at least the first time instant and the second time instant.

15. A method for receiving an uplink signal on physical control channel, the method comprising:

determining that a terminal device has a capability of transmitting the uplink signal on physical control channel in at least a first time instant and a second time instant coherently;

receiving from the terminal device, a first transmission of the uplink signal on physical control channel in the first time instant; and receiving from the terminal device, a second transmission of the uplink signal on physical control channel in the second time instant.

16. The method according to claim 15, wherein the second transmission of the uplink signal on physical control channel is a repetition of the first transmission of the uplink signal on physical control channel.

17. The method according to claim 15, further comprising:

performing channel estimation by coherently combining the first transmission of the uplink signal on physical control channel and the second transmission of the uplink signal on physical control channel.

18. The method according to claim 15, wherein each of the first time instant and the second time instants comprises:

one or more slots; and/or one or more sub-slots; and/or one or more multiple-slots.

19. The method according to claim 15, wherein the second time instant immediately follows the first time instant.

20. The method according to claim 15, wherein the capability of transmitting the uplink signal on physical control channel in at least the first time instant and the second time instant coherently is determined based on at least one of the following:

whether the first time instant and the second time instant are consecutive;

a change in transmission power between the first time instant and the second time instant;

a frequency offset between a central frequency of the first set of subcarriers and a central frequency of the second set of subcarriers; and an uplink spatial relation between uplink control channel transmissions in the first time instant and the second time instant.

* * * * *